United States Patent [19]
Hara et al.

[11] Patent Number: 5,599,075
[45] Date of Patent: Feb. 4, 1997

[54] ANTI-SKID BRAKE CONTROL SYSTEM FOR FOUR-WHEEL DRIVE VEHICLES

[75] Inventors: Tomoyuki Hara, Isehara; Toshiharu Takasaki, Sagamihara, both of Japan

[73] Assignee: Nissan Motor Co., Ltd., Yokohama, Japan

[21] Appl. No.: 518,319

[22] Filed: Aug. 23, 1995

[30] Foreign Application Priority Data

Sep. 21, 1994 [JP] Japan .................................. 6-226470

[51] Int. Cl.$^6$ .................................................. B60K 17/348
[52] U.S. Cl. ........................... 303/143; 303/190; 303/169
[58] Field of Search ...................... 303/190, 169, 303/143

[56] References Cited

U.S. PATENT DOCUMENTS

| | | | |
|---|---|---|---|
| 4,832,145 | 5/1989 | Fujii et al. | 303/190 |
| 4,866,625 | 9/1989 | Kawamoto et al. | 303/143 |

FOREIGN PATENT DOCUMENTS

| | | | |
|---|---|---|---|
| 369179 | 5/1990 | European Pat. Off. | 303/190 |
| 3-246159 | 11/1991 | Japan . | |

Primary Examiner—Matthew C. Graham
Attorney, Agent, or Firm—Foley & Lardner

[57] ABSTRACT

An anti-skid brake control system for a four-wheel drive vehicle employs a transfer which distributes a driving torque to front and rear differentials, a front-wheel mean revolution-speed sensor, a rear-wheel mean revolution-speed sensor, and a four-wheel-drive control section. The four-wheel-drive control section controls a driving-torque distribution ratio of the transfer based on the two mean revolution-speeds detected by the sensors. The system comprises an anti-skid brake control section intercommunicated with the four-wheel-drive control section. The anti-skid brake control section controls a wheel-brake cylinder pressure of each road wheel based on at least a revolution-speed of one of the front road wheels, a revolution-speed of the other wheel of the front road wheels, and the mean revolution-speed detected by the rear-wheel mean revolution-speed sensor. An additional sensor is provided at the one front wheel. An arithmetic processor is provided for calculating the revolution-speed of the other front wheel, based on the revolution-speed detected by the additional sensor, the mean revolution-speed detected by the front-wheel mean revolution-speed sensor, and a final drive ratio in the front differential.

9 Claims, 13 Drawing Sheets

ANTI-SKID BRAKE CONTROL SYSTEM FOR FOUR-WHEEL DRIVE VEHICLES

BACKGROUND OF THE INVENTION

1. Field of the Invention

The present invention relates to an anti-skid brake control system (generally abbreviated to an "ABS") for use in four-wheel drive vehicles, which system is capable of preventing wheel lock-up and thus providing maximum effective braking, and specifically to an anti-skid brake control system for a four-wheel drive vehicle, which system is correlated with an effective wheel-speed sensor arrangement advantageous to both a four-wheel drive vehicle not equipped with an ABS and a four-wheel drive vehicle equipped with an ABS.

2. Description of the Prior Art

On four-wheel drive vehicles with an ABS, for the purpose of ensuring a more precise anti-skid brake control, four wheel-speed sensors are traditionally mounted on respective road wheels. Alternatively, three wheel-speed sensors may be installed to assure an efficient anti-skid brake control according to which a front-left road wheel, a front-right road wheel and a rear road wheel are independently controlled with each other. The latter anti-skid brake control system with three wheel-speed sensors, called a three-channel, three-sensor ABS, has been disclosed in Japanese Patent Provisional Publication (Tokkai Heisei) No. 3-246159. As is generally known, during braking, more of the car weight is transferred to the front road wheels, and thus the wheel load exerted at the front wheels becomes greater than the rear wheels. It will be appreciated that a more precise anti-skid brake control is required at the front wheel side, whereas a very precise anti-skid brake control is not required at the rear wheel side. In the above-noted conventional three-channel anti-skid brake control system disclosed in the Japanese Patent Provisional Publication No. 3-246159, three wheel-speed sensors, consisting of revolution-speed sensors, are attached respectively to a front-left road wheel, a front-right road wheel and a rear propeller shaft connected to a rear differential. Such a three-channel anti-skid brake control is made to independently control the respective road wheels, so that the front-left road wheel is controlled on the basis of a signal from the front-left road wheel speed sensor, the front-right road wheel is controlled on the basis of a signal from the front-right road wheel speed sensor, and the rear road wheels are commonly controlled on the basis of a signal from the propeller-shaft revolution-speed sensor. The value of the signal from the propeller-shaft rotational sensor essentially corresponds to a mean value of the rear-left wheel speed and the rear-right wheel speed. In recent years, the four-wheel drive vehicle with the ABS is constructed to control a driving-torque distribution between the front wheels and the rear wheels, by adjusting an engaging force of a transfer clutch. The driving-torque distribution control is important for the purpose of switching from a two-wheel drive mode to a four-wheel drive mode, or vice versa. Conventionally, such a driving-torque distribution control requires only a mean value of the front-left and front-right wheel speeds and a mean value of the rear-left and rear-right wheel speeds, but never requires all wheel speeds (revolution speeds at respective road wheels). Actually, a revolution speed (essentially corresponding to a mean wheel speed at the front wheel side) of a front propeller shaft connected to a front differential and a revolution speed (essentially corresponding to a mean wheel speed at the rear wheel side) of a rear propeller shaft connected to a rear differential are utilized for the driving-torque distribution control. In case of four-wheel drive vehicles not having option setting for an ABS, it may be preferable to mount a revolution-speed sensor on a front propeller shaft and a revolution-speed sensor on a rear propeller shaft.

However, in case of prior-art four-wheel drive vehicles having option setting for an ABS, as seen in FIG. 14, four revolution-speed sensors 39FL, 39FR, 39RL and 39RR are often pre-mounted on respective four road wheels 12FL, 12FR, 12RL and 12RR of each vehicle, in consideration of an additional installation of an ABS on the four-wheel drive vehicle not equipped with the ABS. In the prior-art four-wheel drive vehicle with the ABS as shown in FIG. 14, an anti-skid brake control section 18b, which will be abbreviated to an "ABS control section", can achieve a high-accuracy, four-channel anti-skid brake control on the basis of signals from the respective sensors 39FL to 39RR. The signal from each revolution-speed sensor is generally produced in the form of a pulse signal. On the other hand, a torque-distribution control section 18a, which will be hereinafter abbreviated to a "4WD control section", receives a front-wheel mean revolution-speed indicative signal $N_F$ (based on the two pulse signals $P_{FL}$ and $P_{FR}$) and a rear-wheel mean revolution-speed indicative signal $N_R$ (based on the two pulse signals $P_{RL}$ and $P_{RR}$) from the ABS control section 18b, and executes a driving-torque distribution control on the basis of the two signals $N_F$ and $N_R$. For instance, when the mean revolution speed indicative signal value NR of the rear wheel side becomes greater than the mean revolution speed indicative signal value $N_F$ of the front wheel side, a driving torque (power), which is produced by an engine 10 and transmitted through a transmission 20, will be delivered to a front differential 26 through a front propeller shaft 24 as well as to a rear differential 30 through a rear propeller shaft 32, by increasing an engaging force of a transfer clutch 66 operably accommodated in a transfer 22. In this case, four revolution-speed sensors would be mounted on respective road wheels irrespective of a four-wheel drive vehicle equipped with an ABS or a four-wheel drive vehicle not equipped with an ABS. Such installation of four sensors is expensive. Additionally, the installation of four sensors is uneconomical in case of a four-wheel drive vehicle not equipped with an ABS, for the reasons set out above.

In case of the previously-noted anti-skid brake control system disclosed in the Japanese Patent Provisional Publication No. 3-246159, in which the front-left wheel speed (the front-left wheel revolution-speed), the front-right wheel speed (the front-right wheel revolution-speed) and the revolution speed of the rear propeller shaft are detected to provide a three-channel anti-skid brake control, the signals from the three sensors is simultaneously utilized for the driving-torque distribution control executed by the 4WD control section. That is, the revolution speed detected at the rear propeller shaft is regarded directly as a mean wheel speed of the rear wheels, while a mean front-wheel speed is derived as a mean value of the detected front-left wheel speed and the front-right wheel speed. The sensor arrangement described in the Japanese Patent provisional Publication No. 3-246159 is superior to that shown in FIG. 14. However, in case that the user selects a four-wheel drive vehicle not equipped with an ABS, it is still uneconomical that three revolution-speed sensors are provided on the four-wheel drive vehicle, because it is desired to install only two revolution-speed sensors respectively at front and rear propeller shafts to reduce manufacturing costs of the vehicle, while ensuring a driving-torque distribution control.

SUMMARY OF THE INVENTION

Accordingly, it is an object of the invention to provide an improved anti-skid brake control system for four-wheel drive vehicles which avoids the foregoing disadvantages of the prior art.

It is another object of the invention to provide an improved anti-skid brake control system for four-wheel drive vehicles which is capable of performing both an anti-skid brake control and a driving-torque distribution control with the minimum of revolution-speed sensors.

In order to accomplish the aforementioned and other objects of the invention, an anti-skid brake control system in combination with a four-wheel drive vehicle employing a transfer distributing a driving torque passing from a transmission to front and rear differentials, a front-wheel mean revolution-speed sensor detecting a mean revolution-speed of front road wheels, a rear-wheel mean revolution-speed sensor detecting a mean revolution-speed of rear road wheels, and four-wheel-drive control means for controlling a driving-torque distribution ratio of the transfer based on the two mean revolution-speeds detected by the sensors, the system comprises anti-skid brake control means intercommunicated with the four-wheel-drive control means, for controlling a wheel-brake cylinder pressure of each road wheel, based on at least a revolution-speed of a first wheel of the front road wheels, a revolution-speed of a second wheel of the front road wheels, and the mean revolution-speed detected by the rear-wheel mean revolution-speed sensor, an additional sensor provided at the first wheel, for detecting the revolution-speed of the first wheel, and arithmetic means for calculating the revolution-speed of the second wheel, based on the revolution-speed of the first wheel, the mean revolution-speed detected by the front-wheel mean revolution-speed sensor, and a final drive ratio of the front differential.

According to another aspect of the invention, a three-channel, three-sensor anti-skid brake control system in combination with a four-wheel drive vehicle employing a transfer distributing a driving torque passing from a transmission to front and rear differentials, and four-wheel-drive control means for controlling a driving-torque distribution ratio of the transfer based on a mean revolution-speed of front road wheels and a mean revolution-speed of rear road wheels, the system comprises a front-wheel mean revolution-speed sensor for detecting the mean revolution-speed of the front road wheels, a rear-wheel mean revolution-speed sensor for detecting the mean revolution-speed of the rear road wheels, anti-skid brake control means intercommunicated with the four-wheel-drive control means, for controlling a wheel-brake cylinder pressure of each road wheel, based on a revolution-speed of a first wheel of the front road wheels, a revolution-speed of a second wheel of the front road wheels, and the mean revolution-speed detected by the rear-wheel mean revolution-speed sensor, an additional sensor provided at the first wheel, for detecting the revolution-speed of the first wheel, and arithmetic means for calculating the revolution-speed of the second wheel, based on the revolution-speed of the first wheel, the mean revolution-speed detected by the front-wheel mean revolution-speed sensor, and a final drive ratio of the front differential.

In case of the transmission consists of an automatic transmission which adjusts the driving torque transmitted therethrough depending on a vehicle speed, it is preferable that the rear-wheel mean revolution-speed sensor consists of a revolution-speed sensor attached to an output shaft of the automatic transmission. The arithmetic means derives the revolution-speed of the second wheel from an equation $N_{F2}=(2N_F/i_f)-N_{F1}$, where $N_{F2}$ is the revolution-speed of the second wheel, $N_F$ is the mean revolution-speed detected by the front-wheel mean revolution-speed sensor, $i_f$ is the final drive ratio of the front differential, and $N_{F1}$ is the revolution-speed of the first wheel.

According to a further aspect of the invention, a four-channel, four sensor anti-skid brake control system in combination with a four-wheel drive vehicle employing a transfer distributing a driving torque to front and rear differentials, and four-wheel-drive control means for controlling a driving-torque distribution ratio of the transfer based on a mean revolution-speed of front road wheels and a mean revolution-speed of rear road wheels, the system comprises a front-wheel mean revolution-speed sensor for detecting the mean revolution-speed of the front road wheels, a rear-wheel mean revolution-speed sensor for detecting the mean revolution-speed of the rear road wheels, anti-skid brake control means intercommunicated with the four-wheel-drive control means, for controlling a wheel-brake cylinder pressure of each road wheel, based on a revolution-speed of a first front wheel of the front road wheels, a revolution-speed of a second front wheel of the front road wheels, a revolution-speed of a first rear wheel of the rear road wheels, and a revolution-speed of a second rear wheel of the rear road wheels, an additional front sensor provided at the first front wheel, for detecting the revolution-speed of the first front wheel, an additional rear sensor provided at the first rear wheel, for detecting the revolution-speed of the first rear wheel, a first arithmetic means for calculating the revolution-speed of the second front wheel, based on the revolution-speed of the first front wheel, the mean revolution-speed detected by the front-wheel mean revolution-speed sensor, and a final drive ratio of the front differential, and a second arithmetic means for calculating the revolution-speed of the second rear wheel, based on the revolution-speed of the first rear wheel, the mean revolution-speed detected by the rear-wheel mean revolution-speed sensor, and a final drive ratio of the rear differential.

According to a still further aspect of the invention, an anti-skid brake control system in combination with an active torque-split four-wheel drive vehicle employing a transfer equipped with a transfer clutch which clutch distributes a driving torque passing from a transmission to front and rear differentials by variably adjusting its engaging force, a front-wheel mean revolution-speed sensor detecting a mean revolution-speed of front road wheels, a rear-wheel mean revolution-speed sensor detecting a mean revolution-speed of rear road wheels, and four-wheel-drive control means for controlling the engaging force of the transfer clutch, based on the two mean revolution-speeds detected by the sensors, the system comprises anti-skid brake control means intercommunicated with the four-wheel-drive control means, for controlling a wheel-brake cylinder pressure of each road wheel, based on at least a revolution-speed of a first wheel of the front road wheels, a revolution-speed of a second wheel of the front road wheels, and the mean revolution-speed detected by the rear-wheel mean revolution-speed sensor, an additional sensor provided at the first wheel, for detecting the revolution-speed of the first wheel, and arithmetic means for calculating the revolution-speed of the second wheel, based on the revolution-speed of the first wheel, the mean revolution-speed detected by the front-wheel mean revolution-speed sensor, and a final drive ratio of the front differential.

DESCRIPTION OF THE PREFERRED EMBODIMENTS

Figure 1:
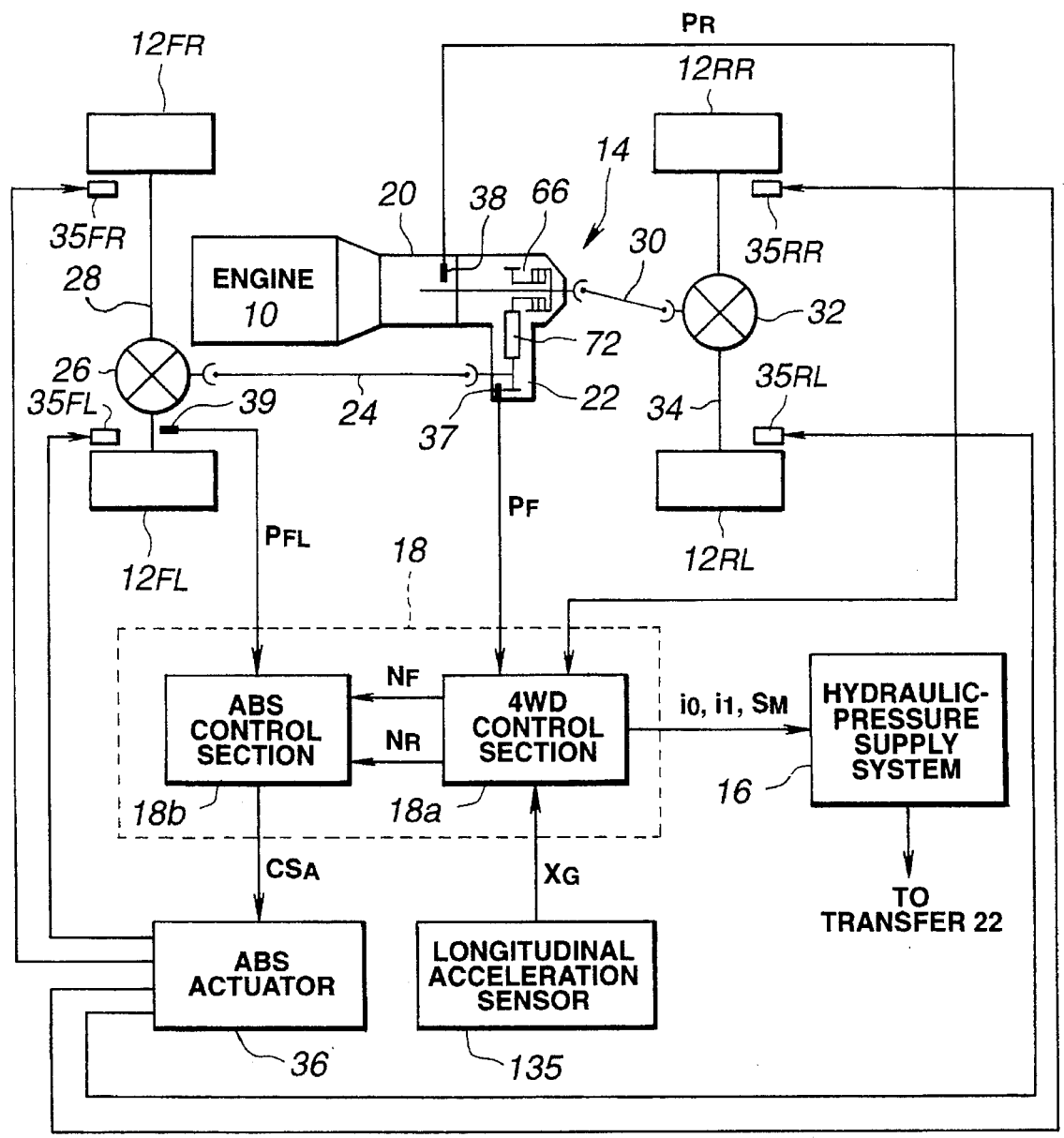
FIG. 1 is a schematic system diagram of a four-wheel drive vehicle with an anti-skid brake control system according to the present invention.
Figure 14:
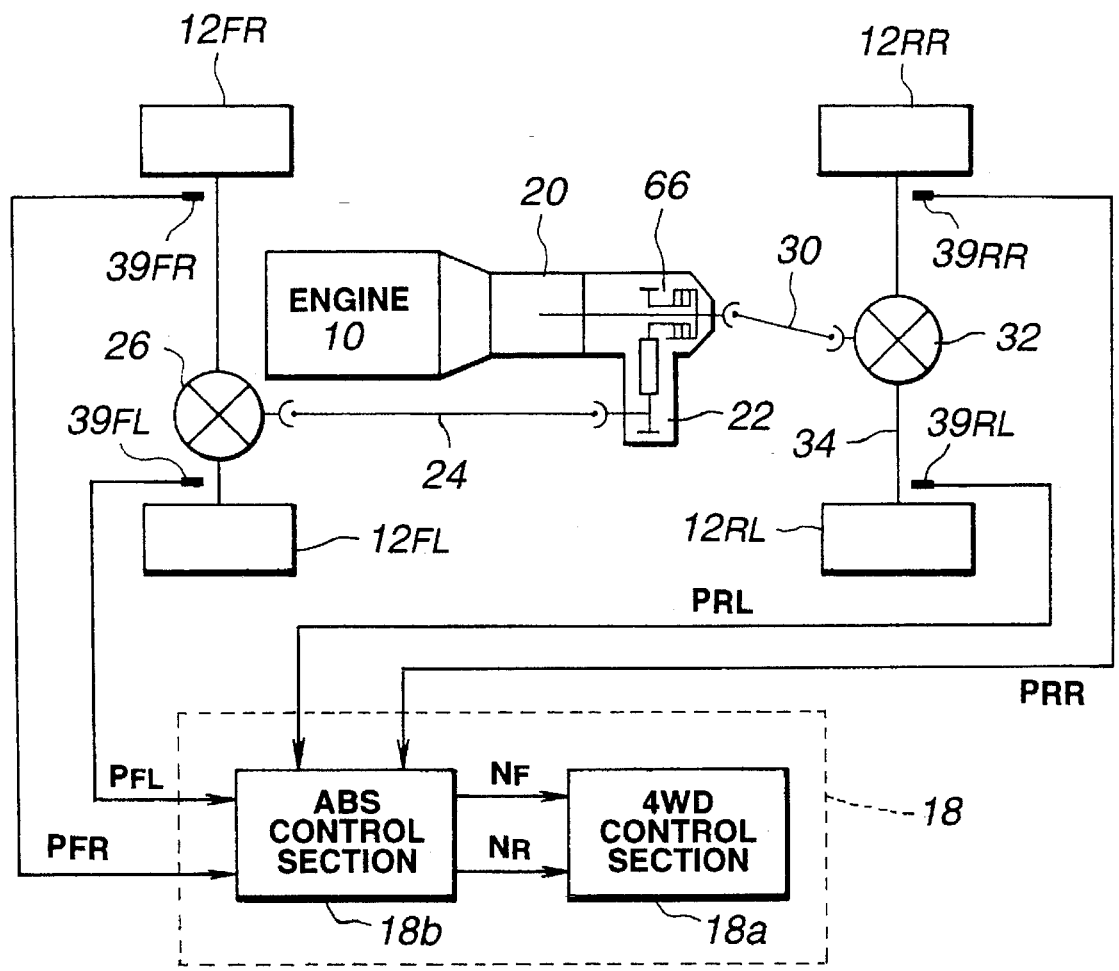
FIG. 14 is a schematic system diagram of a prior-art four-wheel drive vehicle with an anti-skid brake control system.

Referring now to the drawings, particularly to FIG. 1, the anti-skid brake control system made according to the present invention is exemplified in case of a front-engine four-wheel drive vehicle, normally operating in a basic drive mode corresponding to a rear-wheel drive mode, in which the engine power (a driving torque, produced by the engine 10 serving as a prime mover, and passing from a transmission 20 to a transfer case 40) is all delivered to rear road wheels 12RL and 12RR. In the shown embodiment, the same reference numerals used in the previously-noted prior art system shown in FIG. 14 will be applied to the corresponding elements used in the preferred embodiment of FIG. 1, for the purpose of comparison between the prior art system and the improved system of the present invention. Each of the front road wheels 12FL and 12FR is connected to a front differential 26 by means of front drive shafts 28, while each of the rear road wheels 12RL and 12RR is connected to a rear differential 32 by means of rear drive shafts 34. Reference numeral 30 denotes the rear propeller shaft connected to the rear differential 32. The four-wheel drive vehicle includes a power train 14 by means of which a driving-torque distribution ratio between the front (12FL;12FR) and rear (12RL;12RR) drive wheels is changeable. As seen in FIG. 1, the power train 14 includes the transmission 20 transmitting the engine power at a selected gear ratio and a transfer 22 having a transfer clutch 66 and a chain 72 transmitting the power delivered by the transfer clutch 66 to the front propeller shaft 24. A hydraulic pressure supply system 16 is provided to supply a clutch pressure PC to the transfer 22 of the power train 14. Reference numerals 35FL, 35FR, 35RL and 35RR denote a front-left wheel brake cylinder, a front-right wheel brake cylinder, a rear-left wheel brake cylinder and a rear-right wheel brake cylinder. The anti-skid brake control system of the invention also includes a controller 18 which is comprised of a driving-torque distribution control section 18a (4WD control section) and an anti-skid brake control section 18b (ABS control section). The ABS control section 18b is connected to a hydraulic pressure control actuator 36, which will be hereinafter referred to as an "ABS actuator". The ABS actuator 36 receives a master-cylinder pressure coming from a master cylinder (not shown) and suitably changes the master-cylinder pressure to a controlled fluid pressure to be supplied to each wheel cylinder, in response to control signals $CS_A$ from the ABS control section 18b. The ABS control section 18b is connected to a front-left wheel revolution-speed sensor 39 to receive a front-left wheel revolution-speed indicative pulse signal $P_{FL}$ detected by the sensor 39. Additionally, the ABS control section 18b and the 4WD control section 18a are intercommunicated with each other, so that the ABS control section 18b receives a front-wheel mean revolution-speed indicative signal $N_F$ based on a pulse signal $P_F$ and a rear-wheel mean revolution-speed indicative signal $N_R$ based on a pulse signal $P_R$. The pulse signal $P_F$ is generated from a front-wheel mean revolution-speed sensor 37 and input into the 4WD control unit 18a, while the pulse signal $P_R$ is generated from a rear-wheel mean revolution-speed sensor 38 and input into the 4WD control section 18b. The 4WD control section 18a converts the incoming pulse signals $P_F$ and $P_R$ into the front-wheel mean revolution-speed indicative signal $N_F$ and the rear-wheel mean revolution-speed indicative signal $N_R$, respectively. The 4WD control section 18a also receives a longitudinal acceleration indicative signal $X_G$ from a longitudinal acceleration 135.

Figure 2:
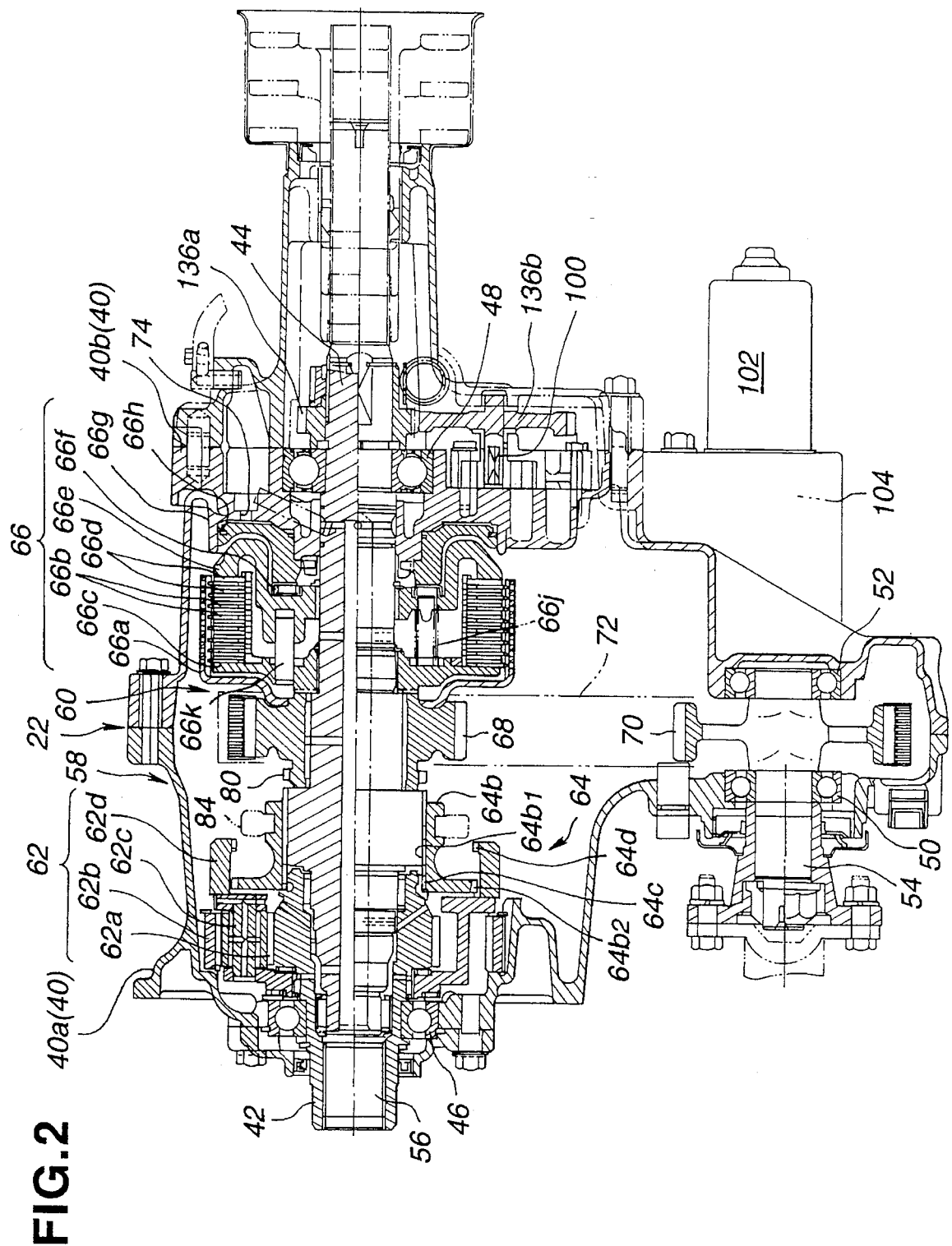
FIG. 2 is a cross-sectional view illustrating a detail of an internal structure of a transfer of the four-wheel drive vehicle shown in FIG. 1.
Figure 3:
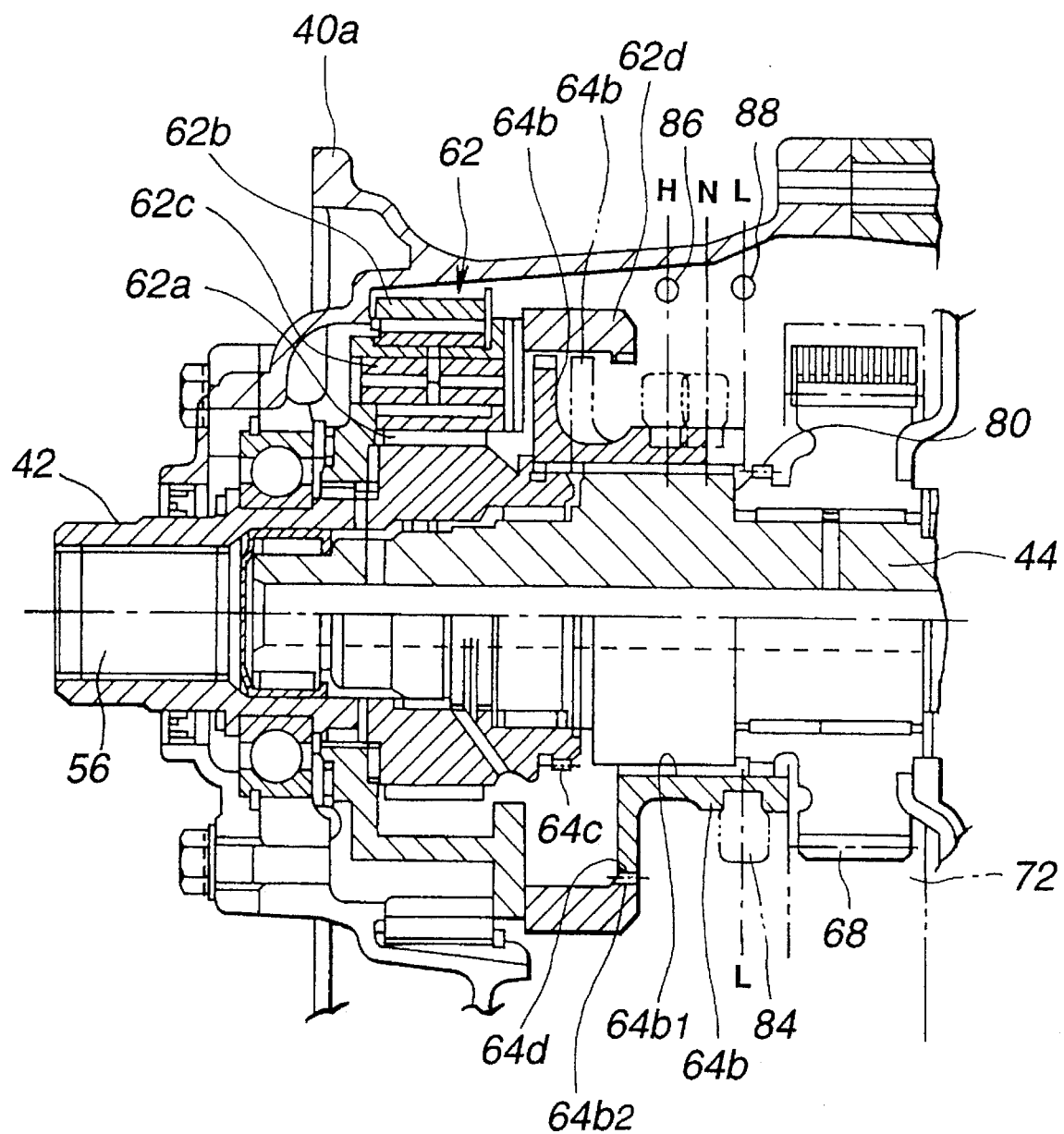
FIG. 3 is a partial cross-sectional view explaining the operation of a shift sleeve of a sub-transmission assembled in the four-wheel drive vehicle of FIG. 2.

Referring now to FIG. 2, there is shown a detailed internal structure of the transfer 22. The transfer 22 includes an input shaft 42 and a first output shaft 44, both rotatably disposed in the transfer casing 40 and coaxially arranged with each other. The input shaft 42 is rotatably supported in the front transfer casing 40a by way of a radial bearing 46, while the first output shaft 44 is rotatably supported in the rear transfer casing 40b by way of a radial bearing 48. The output shaft 42 is separated from the first output shaft 44 to ensure a relative rotation between the two shafts 42 and 44. The transfer 22 also includes a second output shaft 54 rotatably supported by means of a pair of radial bearings 50 and 52, so that the central axis of the second output shaft 54 is parallel with the central axis of the first output shaft 44. As seen in FIG. 2, the bearing 50 is firmly fitted to the front transfer casing 40a, while the bearing 52 is firmly fitted to the rear transfer casing 40b. The input shaft 42 is firmly connected to the output shaft 56 of the transmission 20 to receive the power passing through the transmission, the first output shaft 44 is connected to the rear propeller shaft 30 through a universal joint (not numbered), and the second output shaft 54 is connected to the front propeller shaft 24 through a universal joint (not numbered). The transfer 22 includes a sub-gearchange mechanism 58 and a two-wheel-drive/four-wheel-drive switching mechanism 60. As seen in FIG. 2, the two mechanisms 58 and 60 are operably provided on the outer periphery of the input shaft 42 and the first output shaft 44. The sub-gearchange mechanism 58 comprises a planetary-gear mechanism 62 and a dog-clutch type high-speed/low-speed switching mechanism 64, coaxially arranged with each other. As clearly shown in FIG. 3, the planetary-gear mechanism 62 is comprised of a sun gear 62a formed on the outer periphery of the input shaft 42, an internal gear 62b firmly fitted into the inner peripheral wall of the front transfer casing 40a, a planet-pinion gear 62c in meshed engagement with both the sun gear 62a and the internal gear 62b, and a pinion carrier 62d rotatably supporting the pinion gear 62c. On the other hand, the high-speed/low-speed switching mechanism 64 is comprised of a shift sleeve 64b, a high-speed shift gear 64c and a low-speed shift gear 64d. The shift sleeve 64b has an internal toothed portion $64_{b1}$ and an external toothed portion $64_{b2}$. The shift sleeve 64b is splined to a plurality of key grooves formed on the outer periphery of the first output shaft 44 by means of the internal toothed portion $64_{b1}$, so that the shift sleeve 64b is slidable in its axial direction. The high-speed shift gear 64c is formed on the outer periphery of the input shaft 42 so that the shift gear 64c is brought into meshed engagement with the internal toothed portion $64_{b1}$ by way of a leftward axial sliding movement (viewing FIG. 3) of the shift sleeve 64b. As indicated by the solid line in the upper half of FIG. 3, when the shift sleeve 64b moves to a high-speed shift position (the leftmost position) indicated by a character H, the high-speed shift gear 64c comes into meshed engagement with the internal toothed portion $64_{b1}$. The low-speed shift gear 64d is formed on the inner periphery of the pinion carrier 62d so that the shift gear 64d is brought into meshed engagement with the external toothed portion $64_{b2}$ by way of a rightward axial sliding movement of the shift sleeve 64. As indicated by the solid line in the lower half of FIG. 3, when the shift sleeve 64b moves to a low-speed shift position (the rightmost position) indicated by a character L, the low-speed shift gear 64d comes into meshed engagement with the external toothed portion $64_{b2}$. As indicated by the two-dotted line in the upper half of FIG. 3, when the shift sleeve 64b is shifted to a neutral position (indicated by a character N) substantially midway between the high-speed shift position H and the low-speed shift position L, the shift sleeve 64b is held in the disengaged state in which the internal toothed portion $64_{b1}$ is disengaged from the high-speed shift gear 64c and also the external toothed portion $64_{b2}$ is disengaged from the low-speed shift gear $64_d$. The sliding motion of the shift sleeve 64b is produced by way of a fork 84. In FIG. 3, only the end of the fork 84 is shown.

Returning to FIG. 2, the two-wheel-drive/four-wheel-drive switching mechanism 60 includes a wet multiple-disc friction clutch 66, called the transfer clutch, a first sprocket 68, a second sprocket 70 and the chain 72. As seen in FIG. 2, the part-time four-wheel drive vehicle employing the transfer 22 equipped with the transfer clutch 66 is generally known as an "active torque-split four-wheel drive vehicle". In such an active torque-split four-wheel drive vehicle, a distribution ratio of driving torque of front wheels to rear wheels is actively controlled by variably adjusting an engaging force of the transfer clutch 66 via a controlled clutch pressure $P_C$ produced by the hydraulic pressure supply system 16 detailed later. The first sprocket 68 is rotatably supported on the first output shaft 44. The second sprocket 70 is fixedly connected to the second output shaft 54 so that the second sprocket 70 and the second output shaft 54 are coaxially arranged with each other. The second sprocket 70 has a driven connection with the first sprocket 68 through the chain 72. The transfer clutch 66 includes a clutch drum 66a fixedly connected to the first sprocket 68, a plurality of friction plates 66b splined to the clutch drum 66a, a clutch hub 66c splined onto the outer periphery of the first output shaft 44, a plurality of friction disks 66d integrally connected onto the clutch hub 66c and interleaved with the friction plates 66b, a rotary member 66e disposed close to the outer periphery of the first output shaft 44 for frictional contact between the friction plates 66b and the friction disks 66d, a guide pin 66k connected integral with the clutch hub 66c for ensuring the axial sliding motion of the rotary member 66e, a clutch piston 66g slidably accommodated in a cylinder chamber 66h defined in the inner wall portion of the rear transfer casing 40b for causing the above-mentioned frictional contact, a thrust bearing 66f interleaved between the rotary member 66e and the clutch piston 66g for transmitting the axial sliding motion of the piston 66g to the rotary member 66e, and a return spring 66j biasing the rotary member 66e toward the clutch piston 66g.

Figure 6:
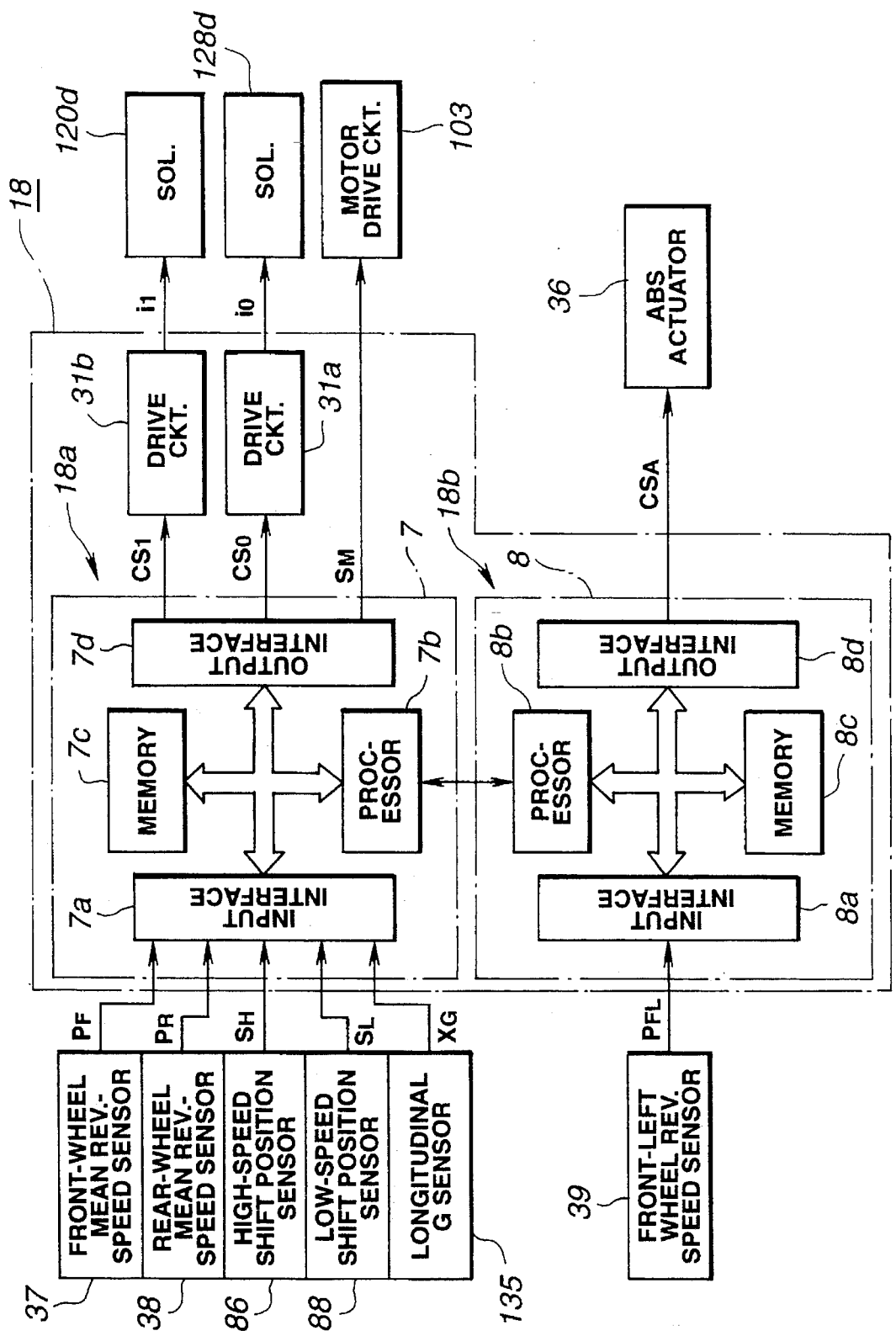
FIG. 6 is a block diagram illustrating a controller including an ABS control section and a 4WD control section.

The clutch pressure $P_C$ from hydraulic pressure supply system is fed into an inlet port 74 which is formed in the rear transfer casing 40b and communicates with the cylinder chamber 66h. When the hydraulic pressure of the cylinder chamber 66h is increased owing to the incoming clutch pressure $P_C$, the clutch piston 66g moves leftward (viewing FIG. 2). The leftward sliding motion of the clutch piston 66g is transmitted through the thrust bearing 66f to the rotary member 66e and thus the friction disks 66d abut the friction plates 66b, with the result that the friction plates 66b come into frictional contact with the friction disks 66d. The degree of the frictional engagement, i.e., the magnitude of the clutch engaging force is dependent on the incoming clutch pressure $P_C$. In this manner, the driving torque passing from the first output shaft 44 can be transmitted through the first sprocket 68, the chain 72 and the second sprocket 70 to the second output shaft 54, at a desired driving-torque distribution ratio depending on the engaging force of the transfer clutch 66. In contrast to the above, owing to the decreased clutch pressure $P_C$, when the rotary member 66e and the clutch piston 66g are placed at their rightmost positions (viewing FIG. 2) by way of the bias of the return spring 66j, the friction plates 66b are held in axially spaced relationship with the friction disks 66d, and thus the power coming from the first output shaft 44 is not transmitted to the second output shaft 54. As seen in FIG. 2, the first sprocket 68 is integrally formed with an additional external gear 80, called a four-wheel-drive gear, which is engageable with the internal toothed portion $64_{b1}$ of the shift sleeve 64b. The additional gear 80 is designed to be meshed with the internal toothed portion $64_{b1}$, simultaneously when the shift sleeve 64b moves to the low-speed shift position L shown in FIG. 3 and the external toothed portion $64_{b2}$ of the shift sleeve 64b is meshed with the low-speed shift gear 64d of the pinion carrier 62d. That is, the shift sleeve 64 and the additional gear 80 are cooperative with each other to construct a dog clutch through which the first output shaft 44 is forcibly connected to the second output shaft 54 at the low-speed shift position L. As previously described, the shift sleeve 64b is moved axially from one of the high-speed shift position H, the neutral position N, and the low-speed shift position L to the other, through the fork 84 by manually operating a sub-gearchange lever (not shown). As seen in FIG. 3, a high-speed shift position sensor 86 is provided to detect that the shift sleeve 64b is shifted to the high-speed shift position H, and to generate a high-speed shift position indicative signal $S_H$ representing that the shift sleeve 64b is held at the high-speed shift position H. In addition, a low-speed shift position sensor 88 is provided to detect that the shift sleeve 64b is shifted to the low-speed shift position L, and to generate a low-speed shift position indicative signal $S_L$ representing that the shift sleeve 64b is held at the low-speed shift position L. As seen in FIG. 6, the signal $S_H$ or $S_L$ is input into the controller 18, as explained later.

Figure 4:
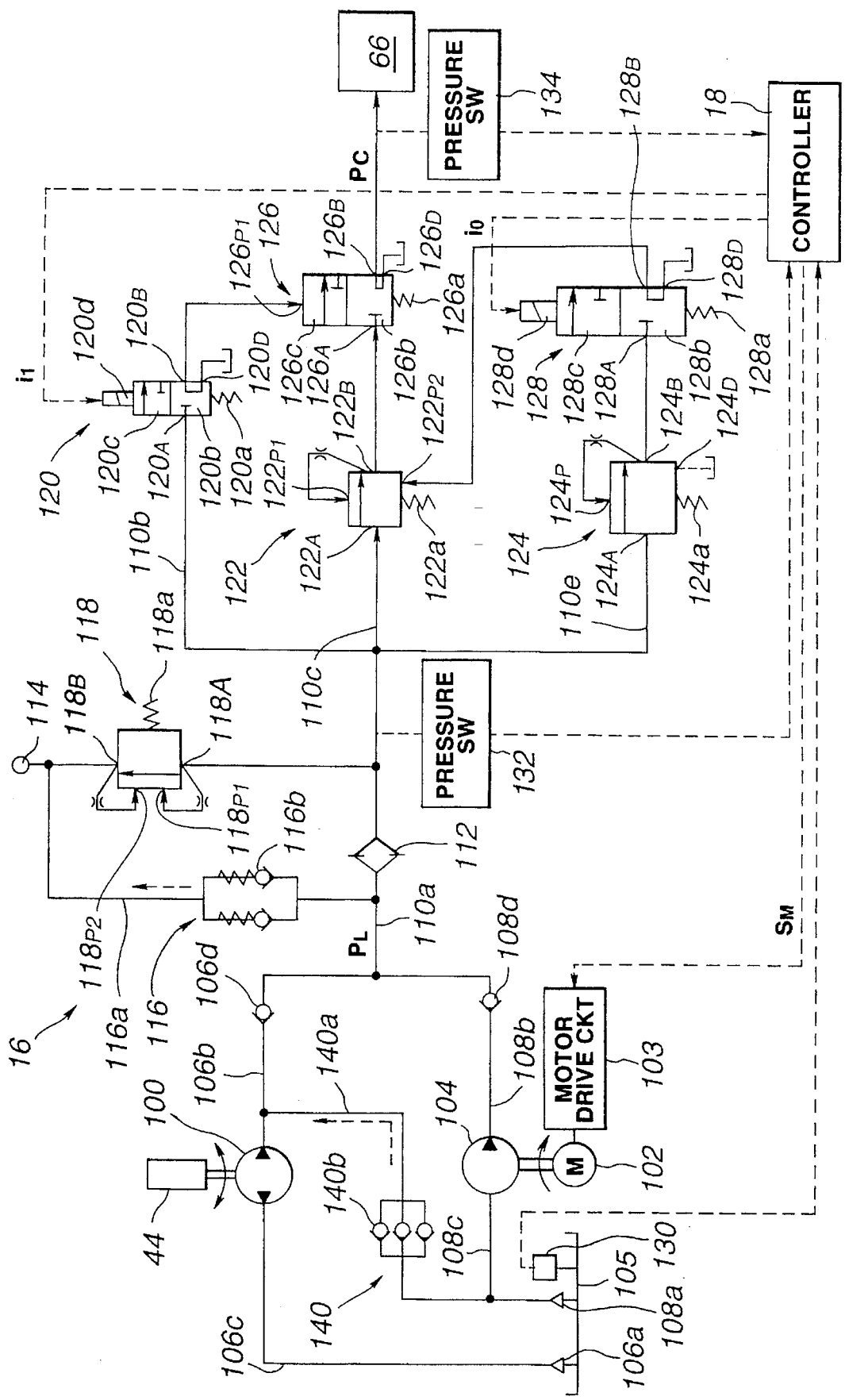
FIG. 4 is a block diagram illustrating a hydraulic-pressure supply circuit generating a clutch pressure for a transfer clutch employed in the four-wheel drive vehicle of FIG. 2.

Referring now to FIG. 4, there is shown a detail of the hydraulic pressure supply system 16. The hydraulic pressure supply system 16 includes a two-directional flow type reversible pump 100 having a driven connection with the input shaft 42 connected to the output shaft 56 of the transmission 20, and a single directional flow type hydraulic oil pump 104 arranged in parallel with the pump 100 and having a driven connection with an electric motor 102. The former pump 100 will be hereinafter referred to as a "main pump", while the latter pump 104 will be hereinafter referred to as a "sub-pump". The sub-pump 104 is provided to function as an auxiliary oil pressure source, in the event that there is less line pressure produced by the main pump 100. As seen in FIG. 4, the main pump 100 suctions working fluid (hydraulic oil) from an oil reservoir 105 through an oil strainer 106a and an oil suction line 106c, and feeds the clean hydraulic oil to an oil delivery line 106a, while the sub-pump 104 suctions hydraulic oil from the reservoir 105 through another oil strainer 108a and an oil suction line 108c, and feeds the clean hydraulic oil to an oil delivery line 108a. Each strainer is provided to prevent dirt and other large particles from entering the pump. A check valve 106d is fluidly disposed in the oil delivery line 106b to prevent back flow of the hydraulic oil to the outlet port of the main pump 100. Similarly, a check valve 108d is fluidly disposed in the oil delivery line 108b to prevent back flow of the hydraulic oil to the outlet port of the sub-pump 104. The two oil delivery lines 106b and 108b are converged to a sole oil supply line 110a. An oil element 112 is fluidly disposed in the oil supply line 110a to remove any impurities from the incoming oil. Upstream of the oil element 112, the oil supply line 110a is fluidly connected to an inlet port of a relief oil passageway 116. The outlet port of the relief oil passageway 116 communicates an oil lubricating system 114. Downstream of the oil element 112, the oil supply line 110a is connected to a line-pressure regulating valve 118. The line-pressure regulating valve 118 is provided to regulate the pressurized hydraulic oil passing from the oil supply line 110a to a predetermined line pressure $P_L$. The oil supply line 110a is divided into three branch lines, namely a first branch line 110b connected to an inlet port of an electromagnetic solenoid type directional control valve 120, a second branch line 110c connected to an inlet port of a clutch pressure control valve 122, and a third branch line 110e connected to an inlet port of a pressure reducing valve 124. The outlet port of the clutch pressure control valve 122 is connected to the inlet port of an external pilot-operated directional control valve 126. The outlet port of the pilot-operated directional control valve 126 is connected to the inlet port 74 of the transfer casing to supply the clutch pressure $P_C$ to the transfer clutch 66 in response to a pilot pressure based on a control signal i1 produced by the controller 18. On the other hand, the outlet port of the pressure reducing valve 124 is connected to the inlet port of a duty-ratio controlled electromagnetic solenoid valve 128 which supplies an external pilot pressure to the clutch pressure control valve 122. Reference numeral 132 denotes a hydraulic pressure switch which is connected to the oil supply line 110a just before the junction of the supply line 110a and the branch lines (110b; 110c; 110e), for detecting the hydraulic oil pressure regulated by the line-pressure regulating valve 118. Reference numeral 134 denotes a hydraulic pressure switch which is connected to a clutch pressure delivery line communicating the outlet port of the pilot-operated directional control valve 126, for detecting the clutch pressure $P_C$ to be delivered to the transfer clutch 66. In the shown embodiment, the main parts constructing the oil pressure supply system 16 are disposed in the transfer 22. As seen in FIG. 2, the main pump 100 is provided in the vicinity of the radial bearing 48 so that the main pump 100 is driven by the first output shaft 44 by means of a first gear 136a and a second gear 136b. On the other hand, the sub-pump 104 is connected to the electric motor 102 attached to the outside wall of the transfer casing (transfer rear casing 40b). In FIG. 4, a by-pass circuit 140 is fluidly disposed between the oil delivery line 106b of the main pump 100 and the oil suction line 108c of the sub-pump 104. The by-pass circuit 140 includes a bypass line 140a and three check valves 140b being parallel to each other and fluidly disposed in the bypass line 140a. The by-pass circuit 140 is provided to supply the hydraulic oil from the suction line 108c to the delivery line 16b in the direction indicated by the broken line with the three check valves 140b opened, when the hydraulic pressure in the delivery line 106b is reduced substantially to vacuum.

Figure 5:
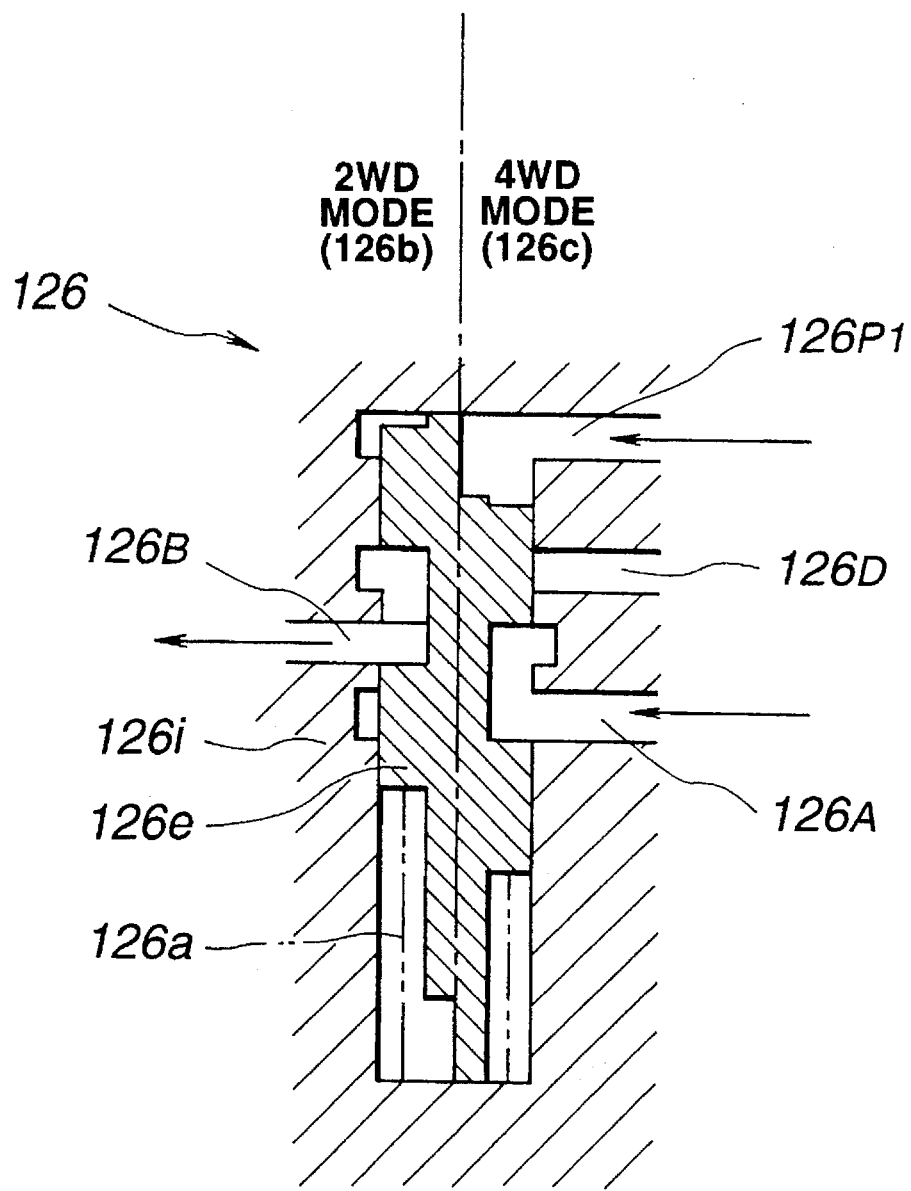
FIG. 5 is a cross sectional view explaining the operation of a pilot-operated switching valve assembled in the hydraulic-pressure supply circuit shown in FIG. 4.

The relief oil passageway 116 includes a relief line 116a disposed between the upstream line of the oil element 112 and the inlet of the oil lubricating system 114, and a pair of spring-loaded ball check valves 116b, set in parallel. The relief oil passageway 116 acts to relieve the high-pressure hydraulic oil to the lubricating system 114 with the check valves opened in the direction indicated by the broken line, when the pressure level of the pressurized hydraulic oil exceeds a predetermined high-pressure level just upstream of the oil element 112, owing to clogging of the element 112. As seen in FIG. 4, the line pressure regulating valve 118 consists of an internal-pilot operated, spring-offset type pressure reducing valve. The line pressure regulating valve 118 has an inlet port 118A connected to the supply line 110a, an outlet port 118B connected to the inlet of the lubricating system 114, a first internal pilot port $118_{P1}$ receiving a primary pressure thereinto through a fixed orifice, a second internal pilot port $118_{P2}$ receiving a secondary pressure from the outlet port 118B thereinto through a fixed orifice, a spool slidably disposed in the valve housing of the pressure regulating valve 118, and a return spring 118a biasing the spool in one axial direction. Also, supplied to the lubricating system 114 is the superfluous hydraulic oil discharged from the outlet port 118B of the line pressure regulating valve 118 after regulating the pressurized hydraulic oil passing through the supply line 110a at a predetermined pressure level. The clutch pressure control valve 122 consists of an internal- and external-pilot operated, spring-offset pressure regulating valve. The clutch pressure control valve 122 includes an inlet port 122A connected to the branch line 110c, an outlet port 122B connected to the inlet of the pilot operated directional control valve 126, an internal pilot port $122_{P1}$ receiving a secondary pressure from the outlet port 122B thereinto through a fixed orifice as a pilot pressure, an external pilot port $122_{P2}$ receiving a controlled pressure generated by the duty-ratio controlled electromagnetic solenoid valve 128, a spool slidably disposed in the valve housing of the clutch pressure control valve 122, and a return spring 122a biasing the spool to one axial direction. The clutch pressure control valve 122 is responsive to the controlled pressure generated from the duty-ratio controlled solenoid valve 128, in such a manner as to establish a full fluid communication between the inlet and outlet ports 122A and 122B in the presence of the controlled pressure generated from the solenoid valve 128. The secondary pressure discharged from the outlet port 122B of the pressure control valve 122 is output to the directional control valve 126 as a clutch pressure $P_C$. In contrast, in the absence of the controlled pressure to be generated from the solenoid valve 128, the pressure control valve 122 operates to block the fluid communication between the inlet and outlet ports 122A and 122B. The pressure reducing valve 124 consists of an internal-pilot operated, spring-offset, constant secondary-pressure type pressure reducing valve. The pressure reducing valve 124 includes an inlet port 124A connected to the branch line 110e, an outlet port 124B connected to the inlet of the duty-ratio controlled solenoid valve 128, an internal-pilot port 124P receiving a secondary pressure from the outlet port 124B thereinto through a fixed orifice, a drain port 124D, and a spool slidably disposed in the valve housing of the reducing valve 124, and a return spring 124a biasing the spool to one axial direction. By way of a proper sliding movement of the spool, based on the pilot pressure (the secondary pressure from the outlet port 124B) fed into the pilot port 124P, the primary pressure coming from the inlet port 124A is decreasingly adjusted to a proper decreased pressure level. The properly reduced hydraulic pressure is supplied from the pressure reducing valve 124 to the inlet port 128A of the duty-ratio controlled solenoid valve 128. The duty-ratio controlled electromagnetic solenoid valve 128 consists of a three-port, two-position electromagnetic solenoid valve. The duty-ratio controlled solenoid valve 128 includes the inlet port connected to the outlet port 124B of the pressure reducing valve 124, a drain port 128D, an outlet port 128B connected to the external-pilot port 122P2 of the clutch pressure control valve 122, a spool slidably disposed in the valve housing of the solenoid valve 128, a return spring 128a biasing the spool to one axial direction, and an electromagnetic solenoid 128d. The solenoid valve 128 is so designed that its valve position is switchable between a normal position 128b wherein a fluid communication between the outlet port 128B and the drain port 128D is established and a solenoid-actuated position 128c wherein a fluid communication between the inlet and outlet ports 128A and 128B is established. The solenoid valve 128 is responsive to a desired duty-cycle controlled exciting current io supplied from the controller 18 in the form of a rectangular pulse signal having a duty cycle determined by the controller. As is generally known, in case of the duty-ratio controlled solenoid valve, a high-level exciting current and a low-level exciting current are repeatedly supplied to the solenoid 128d at a desired duty cycle determined by the controller 18, with the result that the ratio of a time duration of the valve open state and a time duration of the valve closed state is desirably controlled in accordance with the duty ratio and thus the controlled pilot pressure output from the solenoid valve 128 to the clutch pressure control valve 122 can be varied depending on the duty ratio. As appreciated, the pressure level of the clutch pressure $P_C$ generated from the pressure control valve 122 can be suitably adjusted depending on the controlled pilot pressure fed into the pilot port $122_{P2}$. Depending on the pressure level of the clutch pressure $P_C$ adjusted, the engaging force of the transfer clutch 66 is also adjusted properly. That is, the driving-torque distribution ratio of the front wheels to the rear wheels is determined by the clutch pressure $P_C$, i.e., the duty-cycle controlled exciting current io produced by the controller 18. The spring-offset type electromagnetic directional control valve 120 consists of a three-port, two-position electromagnetic solenoid valve. The directional control valve 120 includes an inlet port 120A connected to the branch line 110b, an outlet port 120B connected to the external pilot port $126_{P1}$ of the pilot-operated directional control valve 126, a drain port 120D, a spool slidably disposed in the valve housing of the directional control valve 120, a return spring 120a biasing the spool to one axial direction, and an electromagnetic solenoid 120d. The directional control valve 120 is so designed that its valve position is switchable between a normal position 120b wherein a fluid communication between the outlet port 120B and the drain port 120D is established and a solenoid-actuated position 120c wherein a fluid communication between the inlet and outlet ports 120A and 120B is established and the fluid communication between the outlet port 120B and the drain port 120D is blocked. Note that the directional control valve 120 is controlled by an ON-OFF control but not the above-noted duty-ratio control. That is, the directional control valve 120 is activated or de-activated in response to a current level of the exciting current i1 generated from the controller 18 to the solenoid 120d. When the high-current i1 is supplied to the solenoid 120d, the valve 120 is activated and thus its valve position is shifted to the solenoid-activated position 120c to establish the fluid communication between the inlet and outlet ports 120A and 120B. Under this condition, the line pressure $P_L$ is supplied through the directional control valve 120 to the external pilot port $126_{P1}$ of the pilot-operated directional control valve 126. When the low-current or less current i1 is supplied to the solenoid 120d, the valve 120 is de-activated and thus its valve position is held at the normal position 120b to block the fluid communication between the two ports 120A and 120B. Under this condition, the hydraulic oil supplied to the pilot port $126_{P1}$ is quickly drained through the drain port 120D to the reservoir to extinguish the pilot pressure applied to the pilot-operated directional control valve 126. As seen in FIGS. 4 and 5, the pilot-operated directional control valve 126 consists of a three-port, two-position spring-offset type spool valve. The spool valve 126 includes an inlet port 126A connected to the outlet port 122B of the clutch pressure control valve 122, an outlet port 126B connected to the inlet port 74 of the transfer clutch 66, an external pilot port $126_{P1}$ connected to the outlet port 120B of the directional control valve 120, a drain port 126D, a spool 126e slidably disposed in the valve housing $126_f$ of the spool valve 126, and a return spring 126a biasing the spool $126_e$ to one axial direction (the uppermost position in FIG. 5). In the absence of the pilot pressure to be supplied into the external pilot port $126_{P1}$, as shown in the left half of FIG. 5, the spool 126e is held at the uppermost position (a 2WD-mode position 126b) by way of the bias of the spring 126a, with the result that a fluid communication between the inlet and outlet ports 126A and 126B is blocked and the outlet port 126B is communicated with the drain port 126D, that is, there is no supply of the clutch pressure $P_C$ to the transfer clutch 66. Conversely, when the solenoid 120d of the directional control valve 120 is activated by the exciting current i1 of a high-current level, and thus the pilot pressure is supplied via the valve 120 to the external pilot port $126_{P1}$, as shown in the right half of FIG. 5, the spool 126e is shifted to the lowermost position (a 4WD-mode position 126c) against the bias of the spring 126a by way of the pilot pressure introduced into the pilot port $126_{P1}$, with the result that a fluid communication between the inlet and outlet ports 126A and 126B is established, that is, the clutch pressure $P_C$ based on the duty ratio determined by the controller 18 is supplied through the pilot-operated directional control valve 126 to the transfer clutch 66. As can be appreciated, since the sliding motion of the spool 126e slidably accommodated in the pilot-operated directional control valve 126 is controlled by the pilot pressure of a comparatively high pressure level essentially equal to a pressure level of the line pressure $P_L$, the pilot pressure of a high pressure level can ensure a smooth sliding motion of the spool 126e, even when there is an increased sliding resistance of the spool 126e due to undesired debris or dust which would be caused by friction between the outer sliding surface of the spool 126e and the inner wall surface of the valve housing.

Referring now to FIG. 6, there is shown a detailed structure of the controller 18 including the 4WD control section 18a and the ABS control section 18b. As clearly seen in FIG. 6, the 4WD control section 18a receives a front-wheel mean revolution-speed indicative pulse signal $P_F$ from a front-wheel mean revolution-speed sensor 37, a rear-wheel mean revolution-speed indicative pulse signal $P_R$ from a rear-wheel mean revolution-speed sensor 38 and a longitudinal acceleration indicative signal $X_G$ from a longitudinal acceleration sensor 135, and also receives either the high-speed shift position indicative signal $S_H$ from the high-speed shift position sensor 86 or the low-speed shift position indicative signal $S_L$ from the low-speed shift position sensor 88. The 4WD control section 18a operates to output the duty-cycle controlled exciting current io to the solenoid 128d and the control signal i1 to the solenoid 120d on the basis of the above-noted signals $P_F$, $P_R$, $X_G$ and $S_H$ or $S_L$. Also, the 4WD control section 18a is responsive to a control parameter such a vehicle speed in order to output a control signal $S_M$ to a motor drive circuit 103 for subsidiarily driving the motor 102 having a driving connection with the sub-pump 104, and thus ensuring a predetermined line pressure $P_L$, in the event that, on the basis of the signal from the hydraulic pressure switch 132, the controller 18 determines that a hydraulic oil pressure of the pressurized working fluid produced by the main pump 100 is insufficient. The ABS control section 18b receives the front-wheel mean revolution-speed indicative signal $N_F$ from the 4WD control section 18a, the rear-wheel mean revolution-speed indicative signal $N_R$ from the 4WD control section 18a, and a front-left wheel revolution-speed indicative pulse signal $P_{FL}$ from a front-left wheel revolution-speed sensor 39. Based on these signals $N_F$, $N_R$ and $P_{FL}$, the ABS control section 18b outputs control signals $CS_A$ to the ABS actuator 36, for the purpose of the anti-skid brake control. In the shown embodiment, the three-channel anti-skid brake control is exemplified. Ordinarily, the control signal based on the front-left wheel revolution-speed $N_{FL}$ derived from the pulse signal $P_{FL}$ and a pseudo vehicle speed $V_r$ derived from the signals $N_F$, $N_R$ and $N_{FL}$ is applied to the anti-skid brake control for the front-left road wheel. The control signal based on the front-right wheel revolution-speed $N_{FR}$ derived from the signals $P_{FL}$ and $N_F$ and the pseudo vehicle speed $V_r$ is applied to the anti-skid brake control for the front-right road wheel. The control signal based on the rear-wheel mean revolution-speed $N_R$ derived from the signal $P_R$ and the pseudo vehicle speed $V_r$ is applied to the anti-skid brake control for the rear road wheels. As seen in FIG. 1, the front-wheel mean revolution-speed sensor 37 is provided at the front propeller shaft 24, while the rear-wheel mean revolution-speed sensor 38 is provided at the output shaft 56 of the transmission 20. On the other hand, the front-left wheel revolution-speed sensor 39 is provided at the front-left wheel 12FL. As appreciated, each of the revolution-speed sensors 37, 38 and 39 comprises a pulse pickup. The pulse pickup may consist of an optical revolution-speed sensor or an electromagnetic revolution-speed sensor. The optical revolution-speed sensor traditionally consists of an optical slit plate having a plurality of slits radially arranged from each other at the same pitch with respect to the central axis of the slit plate, a light emitter opposing one surface of the slit plate and a photo-cell (a photo-electric element) opposing the other surface of the slit plate for receiving light passing through the slit plate. In case of the above optical pulse pickup, the optical slip plate is attached to a measured object (a rotary member) for example the front propeller shaft 24, the output shaft 56 of the transmission 20 and a braking disk of the front-left wheel 12FL, while the light emitter and the photo-electric element are attached to a non-rotary member for example the transfer casing 40, a transmission casing and a splash shield of the front-left disk brake. Alternatively, in case of the electromagnetic revolution-speed sensor, the sensor traditionally consists of a geared inductor attached to the measured rotary member, and an electromagnetic pulse pickup opposing the geared portion of the inductor and facing the plane of the inductor. The longitudinal acceleration sensor 135 outputs the longitudinal acceleration indicative signal in the form of a voltage signal. The sensor 135 is so designed that a voltage level of the longitudinal acceleration indicative signal $X_G$ is zero when there is no acceleration or deceleration exerted on the vehicle body, the voltage level of the signal $X_G$ is proportional to an acceleration exerted on the vehicle body in case of a positive value of the longitudinal acceleration, and the voltage level of the signal $X_G$ is proportional to a deceleration exerted on the vehicle body in case of a negative value of the longitudinal acceleration. As seen in FIG. 6, in the preferred embodiment, the 4WD control section 18a is comprised of a microcomputer 7 and a pair of drive circuits 31a and 31b, while the ABS control section 18b is comprised of a microcomputer 8. The microcomputer 7 is provided to make the driving-torque distribution control executed through the transfer clutch 66, and to control the electric motor 102 to maintain the predetermined line pressure $P_L$, and to calculate a front-wheel mean revolution-speed $N_F$ and a rear-wheel mean revolution-speed $N_R$ on the basis of the detected pulse signals $P_F$ (from the sensor 37) and $P_R$ (from the sensor 38). Additionally, in the presence of the low-speed shift position indicative signal $S_L$, the controller 18 decides that the shift sleeve 64b is held in the low-speed shift position L, and then compensates the rear-wheel mean revolution-speed $N_R$ based on the detected pulse signal $P_R$ in consideration of a predetermined gear ratio γ of the sub-gearchange mechanism 58 held at its low-speed shift position L. In more detail, the microcomputer 7 consists of at least an input interface 7a such as an input interface circuit, an arithmetic processor 7b, a memory 7c such as a read only memory (ROM) and a random access memory (RAM), and an output interface 7d such as an output interface circuit. Actually, the input interface 7a receives the signals $P_F$, $P_R$, $X_G$ and $S_H$ or $S_L$, while the output interface 7d outputs a control signal $C_{S0}$ to the drive circuit 31a so as to output the duty-cycle controlled exciting current io to the solenoid 128d of the duty-ratio controlled electromagnetic solenoid valve 128, and also outputs a control signal $C_{S1}$ to the drive circuit 31b so as to output the ON/OFF signal i1 to the solenoid 120d of the directional control valve 120. Actually, the control signal $C_{S0}$ is an analog voltage signal representative of a duty ratio $D_A$ correlated with a target driving torque T delivered to the front wheels 12FL and 12FR, which target torque is determined by the arithmetic processor 7b in accordance with a predetermined arithmetic processing (as explained later) on the basis of the signals $P_F$, $P_R$, $X_G$ and $S_H$ or $S_L$. For the above reasons, the drive circuit 31a includes a pulse-width modulator for modulating the control signal $C_{S0}$ consisting of the analog signal to the duty-cycle controlled exciting current io of the determined duty ratio $D_A$. As previously described, the output interface 7d of the microcomputer 7 outputs the control signal $S_M$ to the motor drive circuit 103. In the shown embodiment, the motor drive circuit 103 is responsive to the control signal $S_M$ to adjust a rotational speed of the motor 102 by way of chopping control. The two microcomputers 7 and 8 are intercommunicated with each other for the purpose of data exchange. The memory 7c memorizes predetermined torque characteristics illustrated in FIGS. 8 to 10 in the form of data map. The memory 7c also stores a program necessary for the control procedure executed by the arithmetic processor 7b and temporarily stores results of calculation, obtained through the control procedure shown in FIG. 7.

Figure 8:
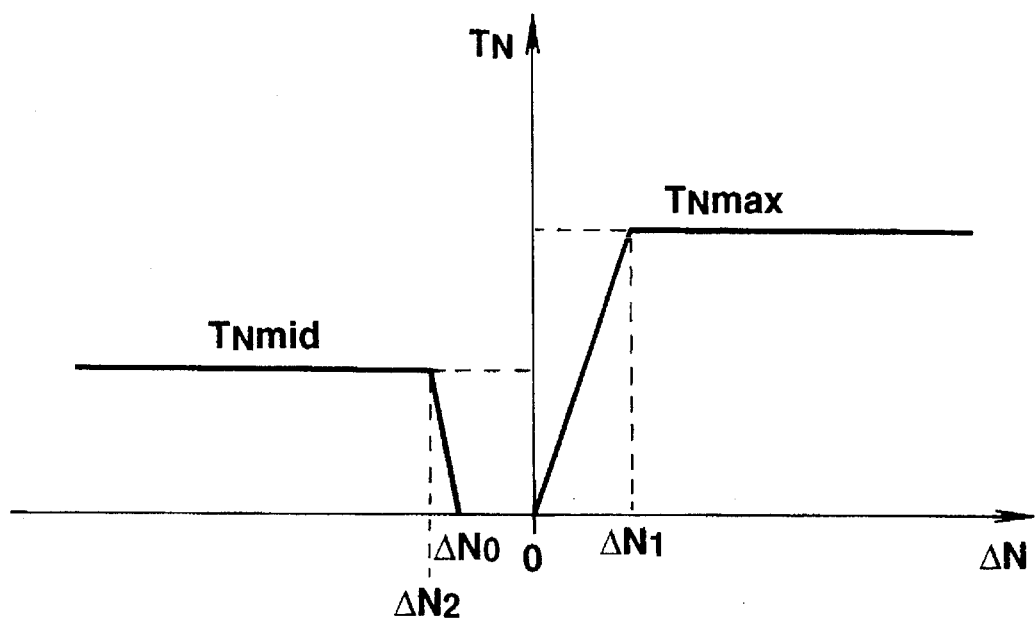
FIG. 8 is a graph illustrating a relationship between a front-and-rear wheel speed difference $\Delta N$ and a wheel-speed difference dependent driving torque $T_N$ to be delivered to the front axle.

Referring to FIG. 8 there is shown the front-and-rear wheel speed difference $\Delta N$ versus wheel-speed difference dependent front-wheel side driving torque $T_N$ characteristic. As seen in the right half of FIG. 8, in case of $(N_R-N_F)>0$, i.e., $\Delta N>0$, the wheel-speed difference dependent front-wheel side driving torque $T_N$ to be delivered to the front wheels is increased in proportion to an increase in the wheel speed difference $\Delta N$ until the wheel speed difference $\Delta N$ reaches a predetermined positive value $\Delta N_1$. Above the predetermined positive value $\Delta N_1$, the wheel-speed difference dependent front-wheel side driving torque $T_N$ is maintained at a predetermined maximum torque $T_{Nmax}$. As seen in the left half of FIG. 8, in case of $(N_R-N_F)<0$, i.e., $\Delta N<0$, the wheel-speed difference dependent front-wheel side driving torque $T_N$ to be delivered to the front wheels is linearly reduced down to zero with a minus gradient within a predetermined negative wheel-speed difference range defined by two negative values $\Delta N_0$ and $\Delta N_2$. Below the predetermined negative value $\Delta N_2$, the wheel-speed difference dependent front-wheel side driving torque $T_N$ is maintained at a predetermined medium torque $T_{Nmid}$.

Figure 9:
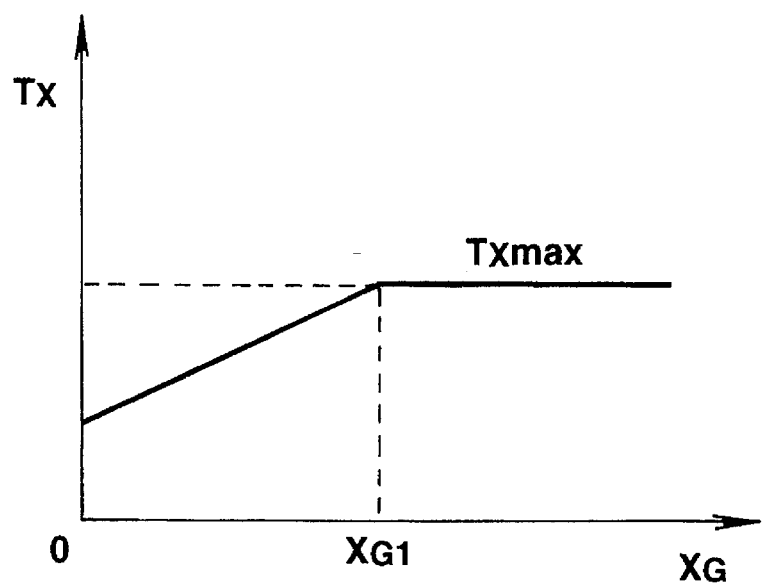
FIG. 9 is a graph illustrating a relationship between a longitudinal acceleration $X_G$ exerted on the vehicle body and a longitudinal acceleration sensitive driving torque $T_X$ to be delivered to the front axle.

Referring now to FIG. 9, there is shown the longitudinal acceleration $X_G$ versus longitudinal acceleration sensitive front-wheel side driving torque $T_X$ characteristic. In accordance with an increase in the longitudinal acceleration $X_G$, the longitudinal acceleration sensitive driving torque $T_X$ is proportionally increased, until the detected longitudinal acceleration $X_G$ reaches a predetermined longitudinal acceleration $X_{G1}$. When the longitudinal acceleration $X_G$ exceeds the predetermined longitudinal acceleration $X_{G1}$, the longitudinal acceleration sensitive driving torque $T_X$ is maintained at a predetermined constant upper limit $T_{Xmax}$.

Figure 10:
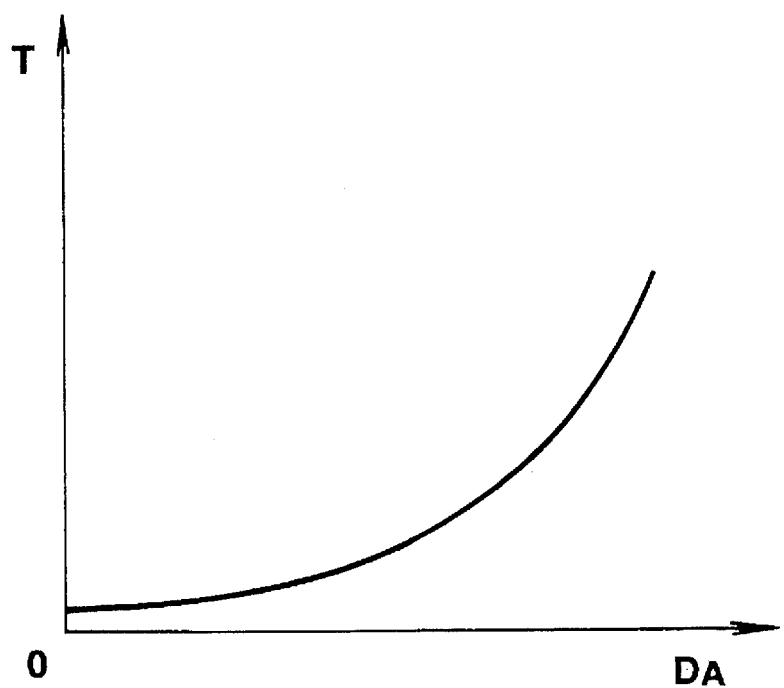
FIG. 10 is a graph illustrating a relationship between a duty ratio DA and a set torque T finally delivered to the front axle.

Referring now to FIG. 10, there is shown the duty ratio $D_A$ versus set torque T characteristic. As appreciated from the characteristic, the set torque T finally delivered to the front wheels is so predetermined to be quadratically increased in accordance with an increase in the duty ratio $D_A$.

On the other hand, the microcomputer 8 consists of at least an input interface 8a such as an input interface circuit, an arithmetic processor 8b, a memory 8c such as a read only memory (ROM) and a random access memory (RAM), and an output interface 8d such as an output interface circuit. The input interface 8a receives the pulse signal $P_{FL}$ from the front-left revolution-speed sensor 39 and converts and derives the pulse signal to an analog signal indicative of the front-left wheel speed $N_{FL}$ which is usually represented in terms of rpm. The arithmetic processor 8b receives the front-wheel mean revolution-speed indicative signal $N_F$ and the rear-wheel mean revolution-speed indicative signal $N_R$ through the arithmetic processor 7b, and the derived front-left wheel speed indicative signal $N_{FL}$ from the input interface 7a so as to execute a control routine (anti-skid control program) shown in FIG. 11. The memory 8c stores the anti-skid control program and temporarily stores data necessary for the arithmetic processing executed by the processor 8b. For the purpose of three-channel anti-skid brake control, the arithmetic processor 8b derives the pseudo vehicle speed $V_r$ as the highest one of the front-wheel mean revolution-speed $N_F$, the rear-wheel mean revolution-speed $N_R$, and the front-left wheel revolution-speed $N_{FL}$, and produces three control signals, namely a first control signal $CS_{A(FL)}$ based on the front-left wheel revolution-speed $N_{FL}$ and the pseudo vehicle speed $V_r$, a second control signal $CS_{A(FR)}$ based on the front-right wheel revolution-speed $N_{FR}$ and the vehicle speed $V_r$, and a third control signal $CS_{A(R)}$ based on the rear-wheel mean revolution-speed $N_R$ and the vehicle speed $V_r$. These control signals $CS_{A(FL)}$, $CS_{A(FR)}$ and $CS_{A(R)}$ are referred generically to as the "control signal $CS_A$". In the shown embodiment, the output interface 8d outputs the control signals $CS_A$ to the ABS actuator 36 for the purpose of executing the three-channel anti-skid brake control in accordance with an anti-skid control map shown in FIG. 12. As can be appreciated from the above, each of the input interfaces 7a and 8a includes a digital-to-analog converter for converting a digital signal such as the incoming pulse signal to an analog signal such as the voltage signal.

Figure 7:
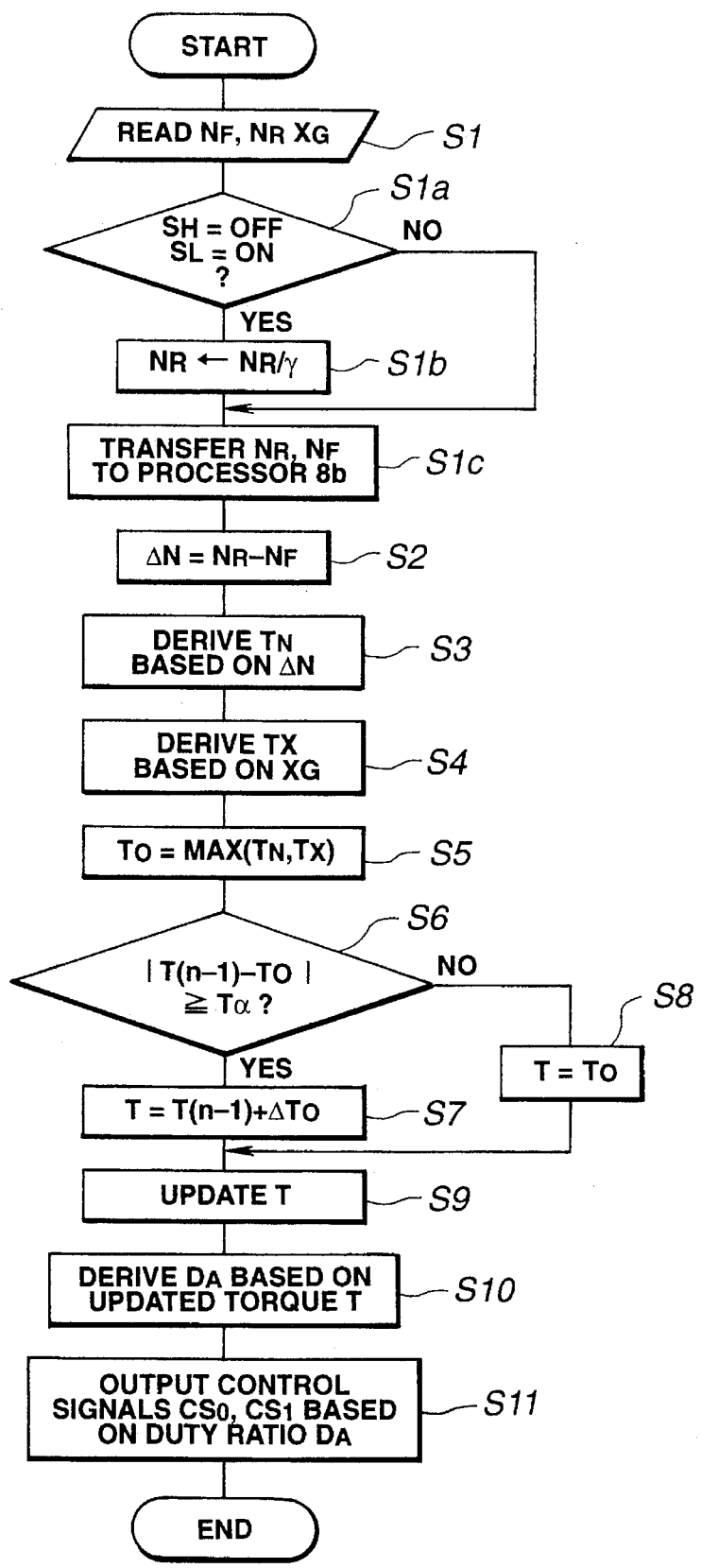
FIG. 7 is a flow chart illustrating a procedure of a driving-torque distribution control executed by the four-wheel-drive vehicle with the anti-skid brake control system of the invention.

The driving-torque distribution control procedure of the microcomputer 7 of the 4WD control section 18a will be hereinafter described in detail in accordance with the flow chart shown in FIG. 7. The control procedure for the driving-torque distribution between the front and rear wheels is executed as time-triggered interrupt routines to be triggered every predetermined time intervals.

In step S1, the front-wheel mean revolution-speed $N_F$, the rear-wheel mean revolution-speed $N_R$ and the longitudinal acceleration $X_G$, all data temporarily stored in the memory $7_c$, are read out.

In step S1a, a test is made to determine whether the high-speed shift position indicative signal $S_H$ from the position sensor 86 is OFF (a low signal level) and the low-speed shift position indicative signal $S_L$ from the position sensor 88 is ON (a high signal level). The answer to step S1a is affirmative (YES), i.e., the 4L range is selected by the select lever of the sub-gearchange mechanism, step S1b proceeds in which the detected rear-wheel mean revolution-speed $N_R$ is compensated in consideration of the predetermined low-speed gear ratio $\gamma$ of the sub gearchange mechanism and replaced with the compensated rear-wheel mean revolution-speed $N_{R/\gamma}$. Conversely, when the answer to step S1a is negative (NO), step S1c proceeds without updating the detected rear-wheel mean revolution-speed $N_R$ temporarily stored in the memory 7c by the compensated rear-wheel mean revolution-speed $N_{R/\gamma}$. In step S1c, the two mean revolution-speeds $N_F$ and $N_R$ are transferred to the arithmetic processor 8b of the microcomputer 8. Thereafter, step 2 enters in which a wheel-speed difference $\Delta N$ between the two mean revolution-speeds $N_F$ and $N_R$ is derived from the expression $\Delta N=N_R-N_F$.

In step S3, the wheel-speed difference dependent front-wheel side driving torque $T_N$ is derived from the data map (See FIG. 8) stored in the memory 7c on the basis of the wheel-speed difference $\Delta N$ derived in step S2. Similarly, in step S4, longitudinal acceleration sensitive front-wheel side driving torque $T_X$ is derived from the data map (See FIG. 9) stored in the memory 7c on the basis of the detected longitudinal acceleration $X_G$ read in step S1. Thereafter, in step S5, the highest one of the wheel-speed difference dependent driving torque $T_N$ is selected in step S3 and the longitudinal acceleration sensitive driving torque $T_X$ derived in step S4, and then the selected one is set as a target torque $T_0$ delivered to the front wheels.

In step S6, a test is made to determine whether an absolute value $|T(n-1)-T_0|$ of the difference between the previous set torque $T(n-1)$ determined prior to one interrupt routine and stored in the memory and the current target torque $T_0$ is greater than or equal to a predetermined threshold value $T\alpha$. An inequality $|T(n-1)-T_0|>T\alpha$ means that the rate of change in the driving torque delivered to the front wheels is comparatively great. In contrast, an inequality $|T(n-1)-T_0|<T\alpha$ means that the rate of change in the driving torque delivered to the front wheels is comparatively less. When the answer to step S6 is affirmative (YES), i.e., in case of $|T(n-1)-T_0|>T\alpha$, the set torque T is set to a new torque obtained by adding a predetermined small increment $\Delta T_0$ to the previous set torque $T(n-1)$ already memorized in the memory 7c in accordance with the interrupt routine triggered previously to the time when the current interrupt routine is executed, in order to suppress an undesiredly great change of the driving torque to be delivered to the front wheels and consequently to prevent a rapid change of behaviour of the vehicle. In contrast, when the answer to step S6 is negative (NO), i.e., in case of $|T(n-1)-T_0|<T\alpha$, step S8 proceeds in which the target torque $T_0$ selected in step S5 is regarded as a new set torque T. Thereafter, step 9 enters in which the set torque T temporarily stored in the memory 7c is updated by a new set torque set by way of step S7 or step S8.

In step S10, a duty ratio $D_A$ is derived and determined from the torque characteristic curve of FIG. 10 on the basis of the updated set torque T.

In step S11, the microcomputer 7 outputs the control signals $C_{S0}$ and $CS_1$ based on the duty ratio $D_A$ derived in step S10. In this manner, one cycle of the interrupt routine (the driving-torque distribution control procedure of the microcomputer 7) terminates.

Figure 11:
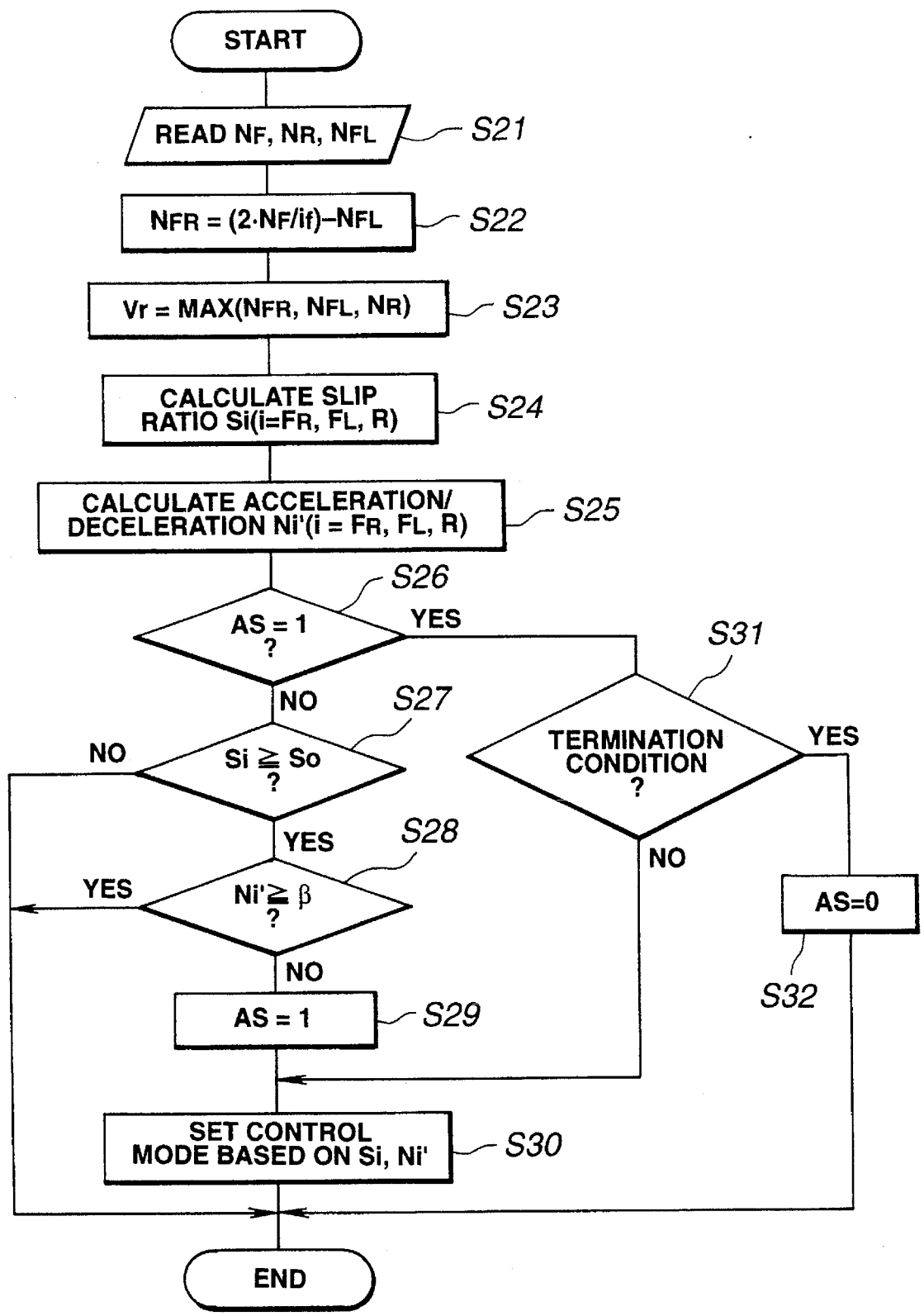
FIG. 11 is a flow chart illustrating a procedure of an anti-skid brake control executed by the four-wheel-drive vehicle of FIG. 2.
Figure 12:
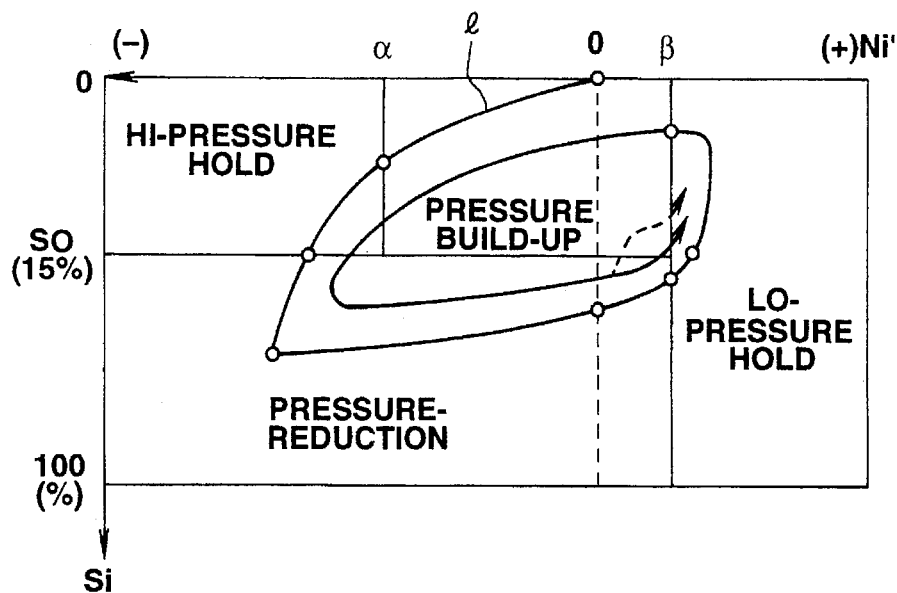
FIG. 12 is a control map used for setting a control mode during the anti-skid control.

On the other hand, the anti-skid brake control procedure of the microcomputer 8 of the ABS control section 18b will be hereinafter described in detail in accordance with the flow chart shown in FIG. 11. The anti-skid control procedure is executed as time-triggered interrupt routines to be triggered every predetermined time intervals such as 20 msec.

In step S21, read out are the front-wheel mean revolution-speed $N_F$, the rear-wheel mean revolution-speed $N_R$, both transferred from the processor 7b to the processor 8b and temporarily stored in the memory 8c, and the front-left wheel revolution-speed $N_{FL}$ based on the pulse signal $P_{FL}$ and also stored in the processor 8b.

In step S22, a front-right wheel revolution-speed $N_{FR}$ is derived from the following equation (1), on the basis of the front-wheel mean revolution-speed $N_F$, the front-left wheel revolution-speed $N_{FL}$, and a predetermined final drive ratio if in the front differential between the front propeller shaft 24 and the front axle (the front drive shafts 28).

$$N_{FR}=(2 N_F/i_f)-N_{FL} \qquad (1)$$

Figure 13:
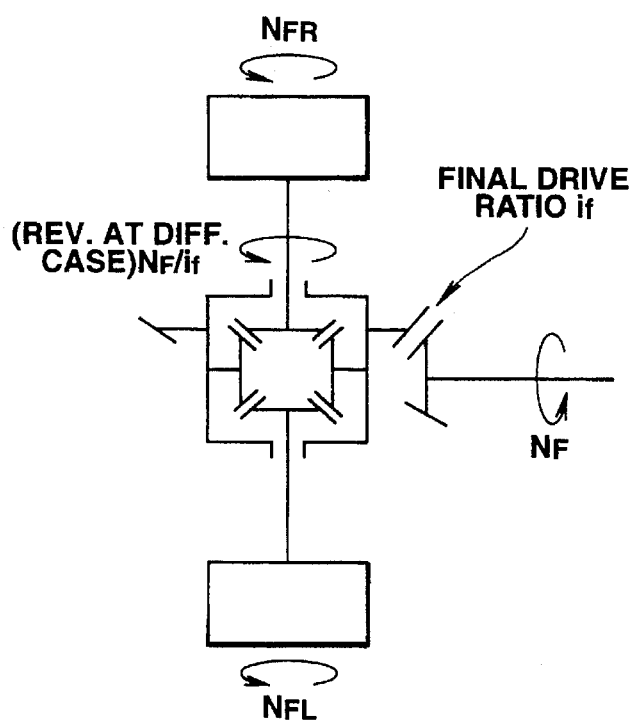
FIG. 13 is an explanatory view of a basic principle of the front differential.

The above equation (1) is based on the fundamental principle (differential action) of the differential. As is generally known, a mean speed $(N_{FR}+N_{FL})/2$ of the front-right wheel revolution-speed $N_{FR}$ and the front-left wheel revolution-speed $N_{FL}$ is equal to a revolution-speed $N_F/i_f$ of the front differential case, as shown in FIG. 13.

In step S23, a pseudo vehicle speed $V_r$ is selected as the highest one of the front-right wheel revolution-speed $N_{FR}$, the front-left wheel speed-revolution $N_{FL}$ and the rear-wheel mean revolution-speed $N_R$, according to a select-HIGH process $\{V_r=MAX(N_{FR}, N_{FL}, N_R)\}$.

In step S24, slip ratios Si (i=FL, FR, R) for the front-left wheel 12FL, the front-right wheel 12FR, and the rear wheels 12RL and 12RR are calculated from the following equation (2), on the basis of the pseudo vehicle speed $V_r$ and each of the revolution-speeds $N_{FL}$, $N_{FR}$ and $N_R$. The revolution-speeds are referred generically to as the "wheel revolution-speed Ni"

$$Si=\{(V_r-N_i)/V_r\}\times 100 \ (\%) \qquad (2)$$

In step S25, a rate Ni' of change per unit hour in each wheel revolution-speed is derived by subtracting the current wheel revolution-speed Ni(n) from the previous wheel revolution-speed Ni(n−1). The change rate Ni' will be hereinafter referred to as a "wheel acceleration/deceleration Ni'". A positive value of the wheel acceleration/deceleration Ni' corresponds to an angular acceleration of the road wheel, while a negative value of the wheel acceleration/deceleration Ni' corresponds to an angular deceleration of the road wheel. In step S25, updated by the current wheel revolution-speeds Ni(n) (i=FR, FL, R) are the previous wheel revolution-speeds Ni(n−1) stored in the predetermined addresses in the memory 8c.

In step S26, a decision is made on the basis of an anti-skid control state indicative flag AS as to whether the anti-skid control is executed or not. In case of AS=1, it is decided that the anti-skid control system (ABS) is in operation. In case of AS=0, it is decided that the ABS is in an in-operative state. The flag AS will be hereinafter referred to as an "anti-skid control flag". When the answer to step S26 is affirmative (YES), i.e., AS=1, step S31 enters in which a test is made to determine whether a particular condition necessary for termination of the anti-skid control is satisfied. Usually, the microcomputer 8 (the ABS control section 18b) determines that the necessary condition for termination of the anti-skid control is satisfied, for example when the vehicle speed is reduced to a considerably low speed slightly greater than 0, that is, when the vehicle is conditioned substantially in its stopping state, or when the number of selection of a moderate pressure build-up mode is above a predetermined number. Conversely, when the answer to step S26 is negative (NO), i.e., AS=0, step S27 proceeds in which a test is made to determine whether the calculated slip ratio Si is greater than or equal to a predetermined reference slip ratio So such as 15%. When the answer to step S27 is negative (NO), i.e., Si<So, the anti-skid control routine terminates, since it is unnecessary for the anti-skid control because of Si<So. When the answer to step S27 is affirmative (YES) i.e., Si≧So, step S28 enters in which a test is made to determine whether the wheel acceleration/deceleration Ni' is greater than or equal to a predetermined positive threshold β of the wheel acceleration/deceleration. When the answer to step S28 is affirmative (YES), i.e., Ni'≧β, it is decided that it is unnecessary to execute the anti-skid control, since the inequality Ni'≧β means that the associated wheel is in the accelerating state. Thus, in case of Ni'≧β, the main program is reached from the anti-skid control routine. In contrast, when the answer to step S28 is negative (NO), i.e., Ni'<β, it is decided that it is necessary to execute the anti-skid control, since the inequality Ni'<β means that the associated wheel is in the decelerating state with an increase in the slip ratio Si. In the case of Ni'<β, step S29 enters in which the anti-skid control flag AS is set at "1". Thereafter, step S30 proceeds in which a proper pressure control mode for each wheel, which wheel is subjected to the anti-skid control, is selected from the mapped data (See the control pressure characteristic curve 1 indicated in FIG. 12) for the anti-skid control, on the basis of both the calculated slip ratio Si and the calculated wheel acceleration/deceleration Ni', and in which the control signal $CS_A$ is determined according to the selected pressure control mode so that the calculated slip ratio Si is gradually adjusted toward the reference slip ratio So (15%). As appreciated, the control signal $CS_A$ determined according to the selected pressure control mode is output to the ABS actuator 36.

In step S31, when the necessary condition for termination of the anti-skid control is satisfied, i.e., the answer to step S31 is affirmative (YES), step S32 enters in which the anti-skid control flag AS is set at "0", and then the anti-skid control routine terminates. When the answer to step S31 is negative (NO), the previously-explained step S30 proceeds so as to adjust the slip ratio Si of the wheel subjected to the anti-skid control to the reference slip ratio So. In this manner, the anti-skid control routine is repeatedly executed every predetermined intervals, while the necessary condition for termination of the anti-skid control is not satisfied.

The anti-skid brake control system for the four-wheel drive vehicle, made according to the invention, operates as follows.

Assuming that the four-wheel drive vehicle is traveling on a low-frictional road surface, the controller 18 will execute both the driving-torque distribution control and the anti-skid brake control, every predetermined time intervals. During driving on low-frictional roads, according to the time-triggered driving-torque distribution control procedure indicated in FIG. 7, the current front-wheel mean revolution-speed $N_F$, the current rear-wheel mean revolution-speed $N_R$, and the longitudinal acceleration $X_G$ are firstly read out from the memory 7c. Thereafter, if necessary, a proper compensation for the rear-wheel mean revolution-speed $N_R$ is made, in consideration of input information, namely the low-speed shift position indicative signal $S_L$ or the high-speed shift position indicative signal $S_H$. The current two revolution-speed data $N_F$ and $N_R$ are also transferred to the microcomputer 8 necessary for the anti-skid brake control processing. Thereafter, the front-and-rear wheel speed difference $\Delta N$ (=$N_R-N_F$) is calculated by subtracting the front-wheel mean revolution-speed $N_F$ from the rear-wheel means revolution-speed $N_R$. Then, the wheel-speed difference dependent front-wheel side driving torque $T_N$ is determined by the data map as shown in FIG. 8 on the basis of the calculated front-and-rear wheel speed difference $\Delta N$. Also, the longitudinal acceleration sensitive front-wheel side driving torque $T_X$ is determined by the data map as shown in FIG. 9 on the basis of the detected longitudinal acceleration $X_G$. The highest one of the wheel-speed difference dependent front-wheel side driving torque $T_N$ and the longitudinal acceleration sensitive front-wheel side driving torque $T_X$ is selected as the target torque $T_0$. Thereafter, the currently selected target torque $T_0$ is compared with the previous set torque $T(n-1)$. In case that the absolute value $|T(n-1)-T_0|$ of the difference between the previous set torque $T(n-1)$ and the current target torque $T_0$ is below the predetermined threshold value $T\alpha$, the current target torque $T_0$ is set to a new set torque T and thus the previous set torque T stored in the memory 7c is updated by the current target torque $T_0$. Conversely, when the absolute value $|T(n-1)-T_0|$ of the difference between the torque values $T(n-1)$ and $T_0$ is above the predetermined threshold value $T\alpha$, a new set torque T is determined by adding the predetermined increment $\Delta T_0$ to the previous set torque $T(n-1)$ already memorized in the memory 7c in accordance with the interrupt routine triggered before one cycle. Based on the new set torque T, the duty ratio $D_A$ is determined by the torque characteristic curve shown in FIG. 10. Thereafter, the controller 18 generates the control signals $C_{S0}$ and $CS_1$, based on the duty ratio $D_A$, to the drive circuits 31a and 31b. By way of the above-explained processing, the rate of change in the driving torque delivered to the front wheels is properly suppressed by providing the predetermined threshold value $T\alpha$. As a result, the driving stability of the four-wheel drive vehicle is ensured. By way of the duty-ratio control based on the exciting current io (corresponding to repetitive pulses produced according to the derived duty ratio $D_A$), the electromagnetic solenoid valve 128 is properly controlled to generate the controlled clutch pressure $P_C$ from the clutch pressure control valve 122. The electromagnetic directional control valve 120 is controlled by way of the ON/OFF control based on the exiting current i1 determined by the derived duty ratio $D_A$. In this manner, the engaging force of the transfer clutch 66 is properly adjusted by the controlled clutch pressure $P_C$ based on the derived duty ratio $D_A$, with the result that the driving-torque distribution ratio between the front and rear wheels is suitably adjusted during the driving on low-frictional roads. As can be appreciated, in the event that the rear drive wheels skid during driving at the two-wheel drive mode on the low-frictional roads, the front-and-rear wheel speed difference $\Delta N$ becomes great owing to skidding of the rear wheels, and thus the wheel-speed difference dependent driving torque $T_N$ tends to be set at a comparatively great value. Under this condition, the drive mode can be shifted from the two-wheel drive mode to the four-wheel drive mode with the driving-torque distribution ratio controlled properly, so as to ensure the driving stability of the vehicle during driving on low frictional roads.

In the event that the brake pedal is depressed during driving on the low-frictional roads, the anti-skid control will be executed so as to prevent skidding. According to the time-triggered anti-skid control procedure indicated in FIG. 11, the current front-wheel mean revolution-speed $N_F$, the current rear-wheel mean revolution-speed $N_R$, and the front-left wheel revolution-speed $N_{FL}$ are firstly read out from the memory 8c, and secondarily the front-right wheel revolution-speed $N_{FR}$ is calculated from the previously-noted equation (1). Thereafter, the pseudo vehicle speed $V_r$ is selected as the highest one of the three wheel revolution-speeds $N_{FR}$, $N_{FL}$ and $N_R$. Based on the calculated pseudo vehicle speed $V_r$ and the respective revolution-speeds $N_{FR}$, $N_{FL}$ and $N_R$, the slip ratios Si (i=FR, FL, R) are calculated from the equation (2). Based on the previous front-right wheel revolution-speed $N_{FR(n-1)}$, the previous front-left wheel revolution-speed $N_{FL(n-1)}$ and the previous rear-wheel mean revolution-speed $N_R(n-1)$, which data are derived according to the previous interrupt routine triggered before the current interrupt routine and already stored in the memory 8c, and additionally on the current front-right wheel revolution-speed $N_{FR(n)}$, the current front-left wheel revolution-speed $N_{FL(n)}$ and the current rear-wheel mean revolution-speed $N_{R(n)}$, the wheel acceleration/decelerations Ni' (i=FR, FL, R) are calculated. If the anti-skid brake control system does not come into operation, i.e., in case of AS=0, the calculated slip ratio Si is compared with the reference slip ratio So to judge the degree of the calculated slip ratio Si. Suppose the brake pedal is strongly depressed, the inequality Si≧So will be satisfied. In this case, since the calculated slip ratio Si is relatively great, the controller 18 determines that the anti-skid control must be executed. After this, the calculated wheel acceleration/deceleration Ni' is compared with the predetermined positive threshold β.

Owing to the brake pedal depressed, the inequality Ni'<β will be satisfied. The controller 18 determines that the vehicle is in the decelerating state, and then the anti-skid control flag AS is set to "1". Based on the calculated wheel acceleration/deceleration Ni' and the calculated slip ratio Si, the pressure control mode for the road wheel which should be controlled according to the anti-skid control, is determined on the basis of the characteristic curve 1 shown in FIG. 12. For example, in case of Si≧So and Ni'<β, as seen in the left-hand side lower zone of FIG. 12, the pressure control mode is set at the pressure reduction mode. The control signals $CS_A$ corresponding to the pressure reduction mode is output to the ABS actuator 36, with the result that the wheel-brake cylinder pressure of the road wheel, which is subjected to the ABS pressure reducing control, is properly reduced to prevent wheel-lock.

In the subsequent time-triggered anti-skid control procedure, if the anti-skid brake control system is in operation, i.e., in case of AS=1, the control routine flows from step S26 to step S31, in order to determine whether the necessary condition for termination of the anti-skid control is satisfied. For example, when the vehicle speed is reduced to a considerably low speed, that is, when the vehicle is conditioned substantially in its stopping state, or when a signal from a brake switch (not shown) is in its OFF state owing to no depression of the brake pedal, the current anti-skid control routine terminates. Alternatively, when the vehicle speed is maintained at a comparatively high speed and additionally the brake pedal remains depressed, the control routine flows from step S31 to step S30 in which the pressure control mode is determined in accordance with the characteristic curve 1 (See FIG. 12) stored in the memory 8c in the form of mapped data. For the purpose of simplification, although the calculated wheel acceleration/deceleration Ni' is compared only with the predetermined positive threshold β in step S28 of FIG. 11, usually, the calculated wheel acceleration/deceleration Ni' is also compared with a predetermined negative threshold α, so as to determine a start timing for the pressure-reduction. In more detail, the negative threshold α corresponds essentially to a threshold necessary for the pressure-reduction start timing, whereas the positive threshold β corresponds essentially to a threshold necessary for the pressure build-up start timing. That is, the negative threshold α is used as a threshold necessary to shift from a rapid pressure build-up mode or a moderate pressure build-up mode to a high-pressure hold mode, while the positive threshold β is used as a threshold necessary to shift from a pressure-reduction mode to a low-pressure hold mode. On the basis of the above-noted comparison result, the controller 18 properly controls each of the front-right wheel-brake cylinder pressure, the front-right wheel-brake cylinder pressure and the rear-wheel-brake cylinder pressure. In this manner, based on both the calculated slip ratio Si and the calculated wheel acceleration/deceleration Ni', the low-pressure hold mode, the moderate pressure build-up mode, the high-pressure hold mode and the pressure reduction mode are repeatedly executed in a manner so as to adjust the slip ratio Si toward the reference slip ratio So (15%), and whereby a desired anti-skid effect is assured.

In the previously-explained embodiment, an additional wheel revolution-speed sensor 39 is provided at the front-left road wheel 12FL for the purpose of the three-channel anti-skid control, while effectively applying the front-wheel mean revolution-speed $N_F$ and the rear-wheel mean revolution-speed $N_R$, both necessary for the driving-torque distribution control for the four-wheel drive vehicle. Alternatively, an additional wheel revolution-speed sensor may be provided at the front-right road wheel 12FL. In this case, a front-left wheel revolution-speed can be arithmetically derived on the basis of the front-wheel mean revolution-speed $N_F$, the detected front-right wheel revolution-speed $N_{FR}$ and the predetermined final drive ratio $i_f$.

Figure 15:
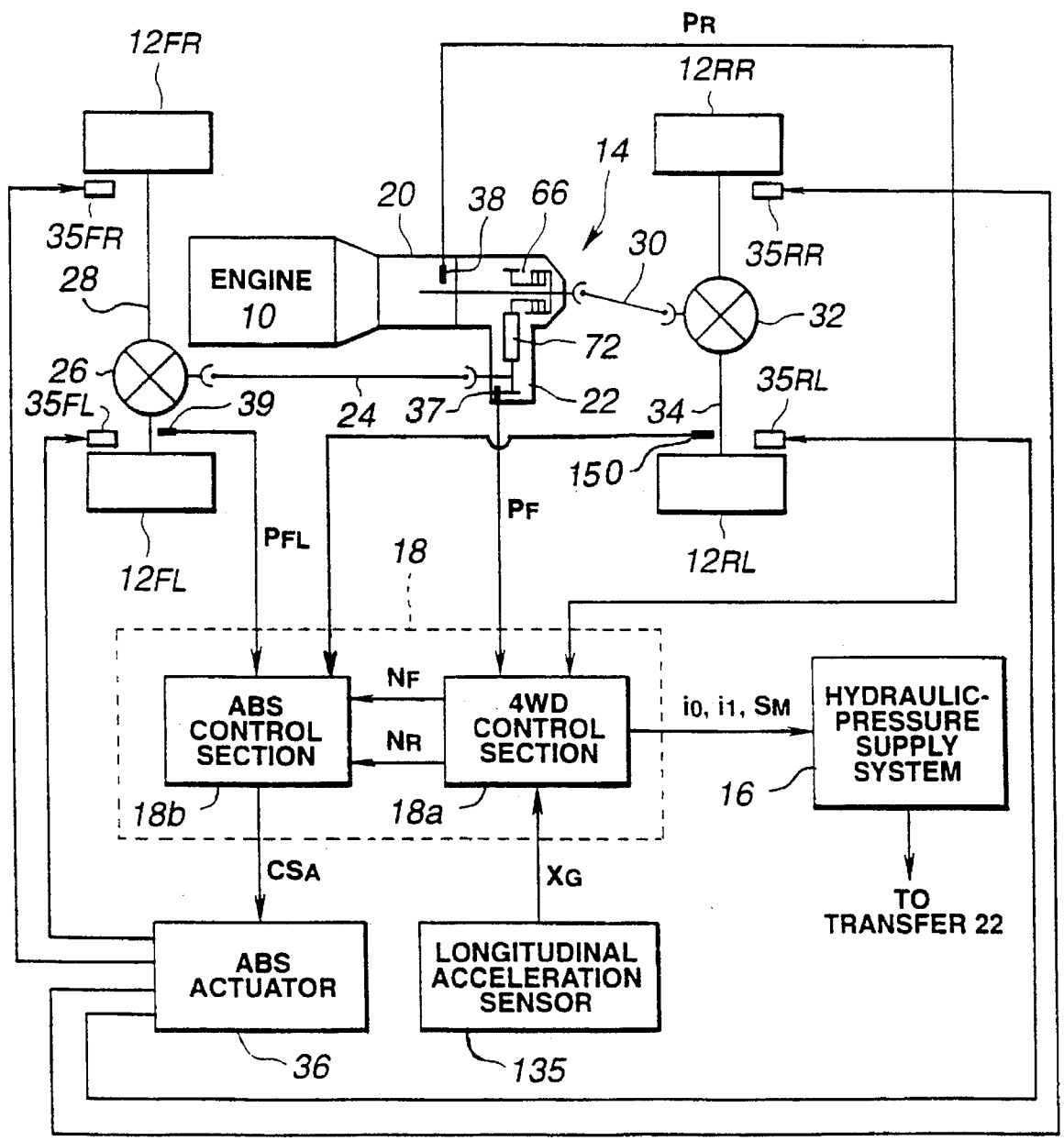
FIG. 15 is a schematic system diagram of a four-wheel drive vehicle with an anti-skid brake control system according to an alternative embodiment of the present invention.

Moreover, in addition to the front-wheel mean revolution-speed sensor 37 and the rear-wheel mean revolution-speed sensor 38, when a first additional wheel revolution-speed sensor is provided at either one of the front road wheels and a second additional wheel revolution-speed sensor 158 is provided at either one of the rear road wheels, as shown in FIG. 15, it can be appreciated that a wheel-speed information ($N_{FL}$, $N_{FR}$, $N_{RL}$, $N_{RR}$) necessary for a four-channel anti-skid control is arithmetically derived in the manner similar to the embodiment. For example, in case that a front-left wheel revolution-speed sensor and a rear-left wheel revolutions speed sensor are provided in addition to a front-wheel mean revolution-speed sensor and a rear-wheel mean revolution-speed sensor, as can be appreciated from the detailed explanation of the embodiment, a front-right wheel revolution-speed $N_{FR}$ can be derived from the detected front-left wheel revolution-speed $N_{FL}$ and the detected front-wheel mean revolution-speed $N_F$ and a predetermined final drive ratio $i_f$ between a front propeller shaft and a front axle, while a rear-right wheel revolution-speed $N_{RR}$ can be derived from the detected rear-left wheel revolution-speed $N_{RL}$ and the detected rear-wheel mean revolution-speed $N_R$ and a predetermined final drive ratio $i_r$ between a rear propeller shaft and a rear axle.

As will be appreciated from the above, in the anti-skid brake control system for a four-wheel drive vehicle, made according to the invention, can arithmetically derive a wheel-speed information ($N_{FL}$, $N_{FR}$, $N_R$) necessary for the three-channel anti-skid control, by additionally providing only one wheel revolution-speed sensor at either one of the front wheels, while applying the front-wheel mean revolution-speed $N_F$ and the rear-wheel mean revolution-speed $N_R$, both used for the driving-torque distribution control for the four-wheel drive vehicle. According to the system of the invention, in case of four-wheel drive vehicles in which an anti-skid brake control system can be optionally mounted, a four-wheel drive vehicle not equipped with an ABS can be easily upgraded to a four-wheel drive vehicle equipped with an ABS.

In the shown embodiment, one of sensors required for the 4WD control is constructed by the rear-wheel mean revolution-speed sensor 38 attached to the output shaft 56 of the transmission 20. In case that the transmission 20 is an automatic transmission, since such a revolution-speed sensor is ordinarily attached to the output shaft 56 of the automatic transmission for providing one (a revolution-speed of the output shaft 56 of the transmission) of various parameters required for automatically controlling the transmission, it is very effective to apply the sensor 38 for the purpose of the driving-torque distribution control for the four-wheel drive vehicle. Alternatively, in case of a manual transmission, it is preferable that a rear-wheel mean revolution-speed sensor is provided at a rear propeller shaft. In this case, since the detected value of the rear-wheel mean revolution-speed sensor provided at the rear propeller shaft directly reflects a rear-wheel mean revolution-speed, there is no necessity for the previously-noted compensation required in case of the rear-wheel mean revolution-speed $N_R$ detected by the sensor 38 attached to the output shaft 56 of the transmission 20.

As can be appreciated, as a whole, the system of the invention may reduce manufacturing costs, irrespective of a four-wheel drive vehicle not equipped with an ABS and a four-wheel drive vehicle equipped with an ABS.

As explained in the embodiment, although each of the 4WD control section 18a and the ABS control section 18b is constructed by a microcomputer, each control section 18a or 18b may be constructed by combining electronic circuits, such as comparators, counters and the like, with each other.

In the embodiment, the transfer 22, in which power (a driving torque) is transmitted from a first sprocket 68 to a second sprocket 70 through a chain 72, is a chain drive. Alternatively, a gear-drive transfer may be utilized by replacing the sprockets 68 and 70 and the chain 72 with a gear mechanism.

Also, in the embodiment, the transfer clutch 66 of the transfer 22 is operated by way of hydraulic oil. The hydraulic oil may be replaced by an incompressible fluid. Furthermore, although the improved system of the invention is applied to a four-wheel drive vehicle with a transfer employing a sub-gearchange system 58, the improved system may be applied to a four-wheel drive vehicle with a transfer not employing a sub-gearchange system.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An anti-skid brake control system in combination with a four-wheel drive vehicle employing a transfer for distributing a driving torque passing from a transmission to front and rear differentials, a front-wheel mean revolution-speed sensor for detecting a mean revolution-speed of front road wheels, a rear-wheel mean revolution-speed sensor for detecting a mean revolution-speed of rear road wheels, and four-wheel-drive control means for controlling a driving-torque distribution ratio of said transfer based on the front-wheel and rear-wheel mean revolution-speeds detected by said front-wheel mean revolution-speed sensor and said rear-wheel mean revolution-speed sensor respectively, said system comprising:

anti-skid brake control means communicating with said four-wheel-drive control means for controlling a wheel-brake cylinder pressure of each road wheel based on at least a revolution-speed of a first wheel of the front road wheels, a revolution-speed of a second wheel of the front road wheels, and the mean revolution-speed detected by said rear-wheel mean revolution-speed sensor;

an additional sensor provided at said first wheel for detecting the revolution-speed of said first wheel; and arithmetic means for calculating the revolution-speed of said second wheel as a function of the revolution-speed of said first wheel, the mean revolution-speed detected by said front-wheel mean revolution-speed sensor, and a predetermined, fixed final drive ratio in the front differential.

2. The system as claimed in claim 1, wherein said transmission comprises an automatic transmission which adjusts the driving torque transmitted therethrough depending on a vehicle speed, and said rear-wheel mean revolution-speed sensor comprises a revolution-speed sensor attached to an output shaft of said automatic transmission.

3. The system as claimed in claim 1, wherein said arithmetic means derives the revolution-speed of said second wheel from an equation $N_{F2}=(2N_F/i_f)-N_{F1}$, where $N_{F2}$ is the revolution-speed of said second wheel, $N_F$ is the mean revolution-speed detected by said front-wheel mean revolution-speed sensor, $i_f$ is the final drive ratio of the front differential, and $N_{F1}$ is the revolution-speed of said first wheel.

4. A three-channel, three-sensor anti-skid brake control system in combination with a four-wheel drive vehicle employing a transfer for distributing a driving torque passing from a transmission to front and rear differentials, and four-wheel-drive control means for controlling a driving-torque distribution ratio of said transfer based on a mean revolution-speed of front road wheels and a mean revolution-speed of rear road wheels, said system comprising:

a front-wheel mean revolution-speed sensor for detecting said mean revolution-speed of the front road wheels;

a rear-wheel mean revolution-speed sensor for detecting said mean revolution-speed of the rear road wheels;

anti-skid brake control means communicating with said four-wheel-drive control means for controlling a wheel-brake cylinder pressure of each road wheel based on a revolution-speed of a first wheel of the front road wheels, a revolution-speed of a second wheel of the front road wheels, and said mean revolution-speed detected by said rear-wheel mean revolution-speed sensor;

an additional sensor provided at said first wheel for detecting the revolution-speed of said first wheel; and arithmetic means for calculating the revolution-speed of said second wheel as a function of the revolution-speed of said first wheel, the mean revolution-speed detected by said front-wheel mean revolution-speed sensor, and a predetermined, fixed final drive ratio in the front differential.

5. The system as claimed in claim 4, wherein said transmission comprises an automatic transmission which adjusts the driving torque transmitted therethrough depending on a vehicle speed, and said rear-wheel mean revolution-speed sensor comprises a revolution-speed sensor attached to an output shaft of said automatic transmission.

6. The system as claimed in claim 4, wherein said arithmetic means derives the revolution-speed of said second wheel from an equation $N_{F2}=(2N_F/i_f)-N_{F1}$, where $N_{F2}$ is the revolution-speed of said second wheel, $N_F$ is the mean revolution-speed detected by said front-wheel mean revolution-speed sensor, $i_f$ is the final drive ratio of the front differential, and $N_{F1}$ is the revolution-speed of said first wheel.

7. A four-channel, four sensor anti-skid brake control system in combination with a four-wheel drive vehicle employing a transfer distributing a driving torque to front and rear differentials, and four-wheel-drive control means for controlling a driving-torque distribution ratio of said transfer based on a mean revolution-speed of front road wheels and a mean revolution-speed of rear road wheels, said system comprising:

a front-wheel mean revolution-speed sensor for detecting said mean revolution-speed of the front road wheels;

a rear-wheel mean revolution-speed sensor for detecting said mean revolution-speed of the rear road wheels;

anti-skid brake control means intercommunicated with said four-wheel-drive control means, for controlling a wheel-brake cylinder pressure of each road wheel, based on a revolution-speed of a first front wheel of the front road wheels, a revolution-speed of a second front wheel of the front road wheels, a revolution-speed of a first rear wheel of the rear road wheels, and a revolution-speed of a second rear wheel of the rear road wheels;

an additional front sensor provided at said first front wheel, for detecting the revolution-speed of said first front wheel;

an additional rear sensor provided at said first rear wheel, for detecting the revolution-speed of said first rear wheel;

a first arithmetic means for calculating the revolution-speed of said second front wheel, based on the revolution-speed of said first front wheel, said mean revolution-speed detected by said front-wheel mean revolution-speed sensor, and a final drive ratio of the front differential; and a second arithmetic means for calculating the revolution-speed of said second rear wheel, based on the revolution-speed of said first rear wheel, said mean revolution-speed detected by said rear-wheel mean revolution-speed sensor, and a final drive ratio of the rear differential.

8. An anti-skid brake control system in combination with an active torque-split four-wheel drive vehicle employing a transfer equipped with a transfer clutch which distributes a driving torque passing from a transmission to front and rear differentials by variably adjusting an engaging force of the transmission, a front-wheel mean revolution-speed sensor detecting a mean revolution-speed of front road wheels, a rear-wheel mean revolution-speed sensor detecting a mean revolution-speed of rear road wheels, and four-wheel-drive control means for controlling the engaging force of the transfer clutch, based on the front-wheel and rear-wheel mean revolution-speeds detected by said front-wheel mean revolution-speed sensor and said rear-wheel mean revolution-speed sensor respectively, said system comprising:

anti-skid brake control means communicating with said four-wheel-drive control means for controlling a wheel-brake cylinder pressure of each road wheel based on at least a revolution-speed of a first wheel of the front road wheels, a revolution-speed of a second wheel of the front road wheels, and the mean revolution-speed detected by said rear-wheel mean revolution-speed sensor;

an additional sensor provided at said first wheel for detecting the revolution-speed of said first wheel; and arithmetic means for calculating the revolution-speed of said second wheel as a function of the revolution-speed of said first wheel, the mean revolution-speed detected by said front-wheel mean revolution-speed sensor, and a predetermined, fixed final drive ratio in the front differential.

9. An anti-skid brake control system in combination with a four-wheel drive vehicle employing a transfer for distributing a driving torque passing from a transmission to front and rear differentials, a front-wheel mean revolution-speed sensor for detecting a mean revolution-speed of front road wheels, a rear-wheel mean revolution-speed sensor for detecting a mean revolution-speed of rear road wheels, and four-wheel-drive control means for controlling a driving-torque distribution ratio of said transfer based on front-wheel and rear-wheel mean revolution-speeds detected by said front-wheel mean revolution-speed sensor and said rear-wheel mean revolution-speed sensor respectively, said system comprising:

anti-skid brake control means communicating with said four-wheel-drive control means for controlling a wheel-brake cylinder pressure of each road wheel based on at least a revolution-speed of a first wheel equipped with a wheel revolution-speed sensor and a revolution-speed of a second wheel unequipped with a wheel revolution-speed sensor and laterally spaced opposite to said first wheel; and arithmetic means for calculating the revolution-speed of said second wheel as a function of the revolution-speed detected by said wheel revolution-speed sensor of said first wheel, the mean revolution-speed detected by one of said front-wheel mean revolution-speed sensor and said rear-wheel mean revolution-speed sensor and corresponding to a mean revolution-speed between said first wheel and said second wheel, and a predetermined, fixed final drive ratio in the differential connected to said first wheel and said second wheel.

* * * * *